United States Patent [19]
Higurashi et al.

[11] Patent Number: 5,991,501
[45] Date of Patent: *Nov. 23, 1999

[54] APPARATUS AND METHOD FOR RECORDING AND REPRODUCING DIGITAL SIGNALS ON FIRST AND SECOND AREAS OF A STORAGE MEDIUM

[75] Inventors: Seiji Higurashi, Tokyo; Takeo Ohishi; Mitsuo Harumatsu, both of Yokohama, all of Japan

[73] Assignee: Victor Company of Japan, Ltd., Yokohama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/671,335

[22] Filed: Jun. 27, 1996

[30] Foreign Application Priority Data

Jun. 28, 1995 [JP] Japan ................................. 7-184797

[51] Int. Cl.⁶ ........................ G11B 5/09; H04N 5/91; H04N 9/79
[52] U.S. Cl. ........................ 386/98; 360/53; 360/48; 386/124; 386/40
[58] Field of Search ........................ 360/48, 53; 386/2, 386/47, 40, 98, 124, 39

[56] References Cited

U.S. PATENT DOCUMENTS

| 5,422,761 | 6/1995 | Anderson et al. | 360/47 |
| 5,579,183 | 11/1996 | Van Gestel et al. | 360/48 |
| 5,774,289 | 6/1998 | Seki | 360/48 |

FOREIGN PATENT DOCUMENTS

| 0314456 | 5/1989 | European Pat. Off. . |
| 0600467 | 6/1994 | European Pat. Off. . |
| 0635830 | 1/1995 | European Pat. Off. . |
| 9522826 | 8/1995 | WIPO . |

*Primary Examiner*—Aristotelis M. Psitos
*Assistant Examiner*—Regina Y. Neal
*Attorney, Agent, or Firm*—Pollock, Vande Sande & Amernick

[57] ABSTRACT

A digital signal is recorded along tracks on a recording medium. Each of the tracks has plural areas. A portion of the digital signal which is recorded on a first area out of the plural areas includes information for reproduction of the digital signal. The information is recorded also on at least one of second areas out of the plural areas. The second areas are greater in size than the first area. The information includes, for example, subcode header information.

12 Claims, 14 Drawing Sheets

FIG. 9

| | FORMAT ID (SB# = 4n) 71 | INFORMATION 1 (SB# = 4n + 1) 72 |
|---|---|---|
| BIT 7 | | |
| BIT 6 | | |
| BIT 5 | | |
| BIT 4 | FORMAT INFORMATION | RESERVED |
| BIT 3 | | |
| BIT 2 | | |
| BIT 1 | | |
| BIT 0 | | |

| | INFORMATION 2 (SB# = 4n + 2) | INFORMATION 3 (SB# = 4n + 3) |
|---|---|---|
| BIT 7 | | |
| BIT 6 | | |
| BIT 5 | | |
| BIT 4 | RESERVED | RESERVED |
| BIT 3 | | |
| BIT 2 | | |
| BIT 1 | | |
| BIT 0 | | |

| | | MAIN HEADER<br>FIRST BYTE<br>BITS 7 6 5 4 |
|---|---|---|
| 0 | FORMAT ID | BITS 7 6 5 4 |
| 1 | FORMAT ID | BITS 3 2 1 0 |
| 2 | INFO 1 | BITS 7 6 5 4 |
| 3 | INFO 1 | BITS 3 2 1 0 |
| 4 | INFO 2 | BITS 7 6 5 4 |
| 5 | INFO 2 | BITS 3 2 1 0 |
| 6 | INFO 3 | BITS 7 6 5 4 |
| 7 | INFO 3 | BITS 3 2 1 0 |
| 8 ⌇ 11 | RESERVED | |

FIG. 12

| | CONTENTS | |
|---|---|---|
| | FIRST BYTE | SECOND BYTE |
| BIT 7 | SUBCODE HEADER INFORMATION | OTHER INFORMATION |
| BIT 6 | SUBCODE HEADER INFORMATION | OTHER INFORMATION |
| BIT 5 | SUBCODE HEADER INFORMATION | OTHER INFORMATION |
| BIT 4 | SUBCODE HEADER INFORMATION | OTHER INFORMATION |
| BIT 3 | OTHER INFORMATION | OTHER INFORMATION |
| BIT 2 | OTHER INFORMATION | OTHER INFORMATION |
| BIT 1 | OTHER INFORMATION | OTHER INFORMATION |
| BIT 0 | OTHER INFORMATION | OTHER INFORMATION |

95

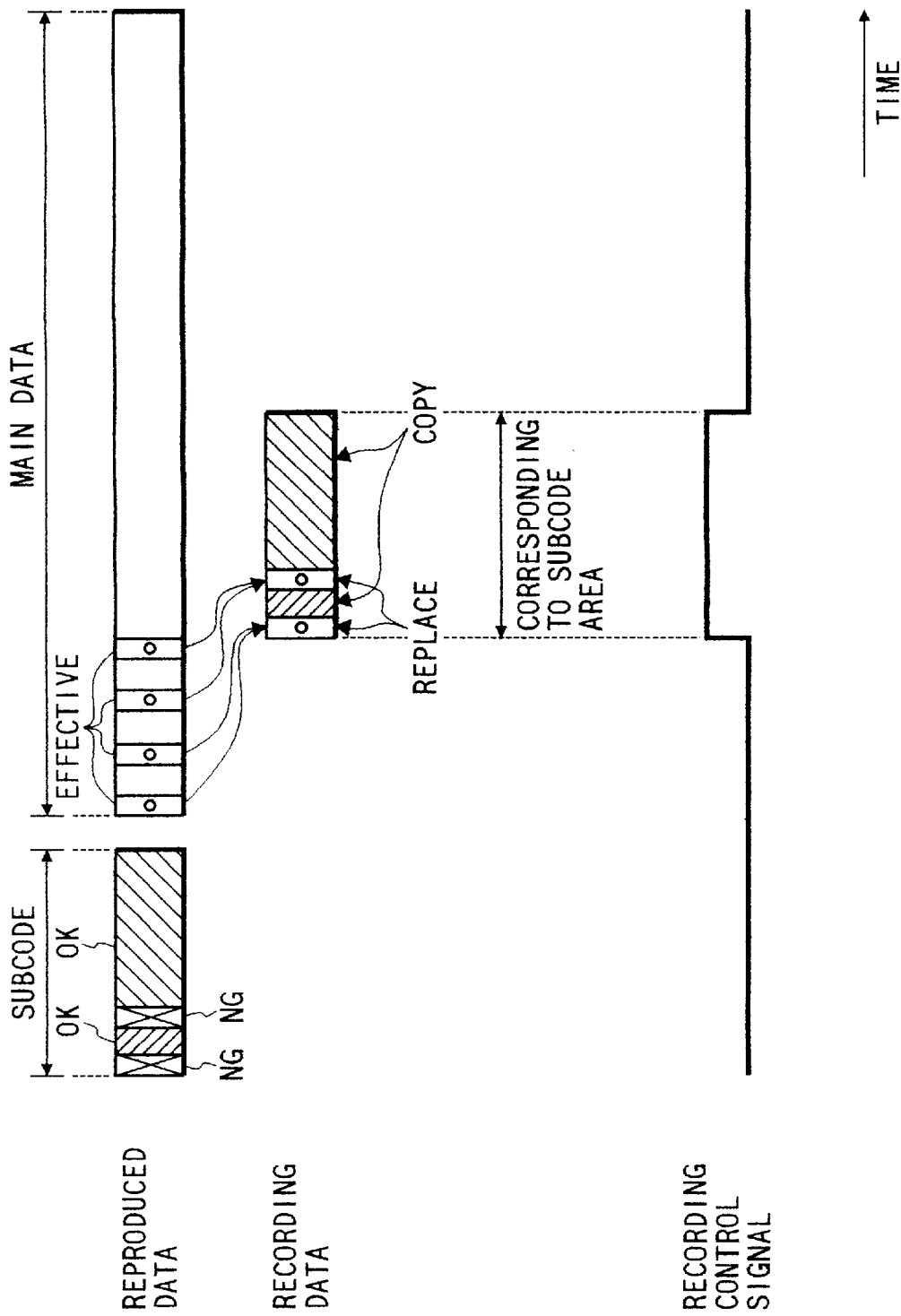

APPARATUS AND METHOD FOR RECORDING AND REPRODUCING DIGITAL SIGNALS ON FIRST AND SECOND AREAS OF A STORAGE MEDIUM

BACKGROUND OF THE INVENTION

1. Field of the Invention

This invention relates to a method and an apparatus for recording a digital signal. This invention also relates to a method and an apparatus for reproducing a digital signal. This invention further relates to a method and an apparatus for recording and reproducing a digital signal. This invention also relates to a recording medium.

2. Description of the Prior Art

A DAT (digital audio tape) system records and reproduces a digital audio signal and data on and from a magnetic tape. The DAT track format prescribes two subcode areas and one main data area as data recording blocks. Each of data recording blocks has a size of 288 bits, that is, 36 bytes.

In the DAT system, a format ID (identification) signal indicating the use of main data is stored in a main header within a main data block. For example, the format ID signal denotes either the audio use or the data use. In the DAT system, since the format ID signal is stored in the main data block, the recovery of format information requires reproducing a signal from the main data block.

SUMMARY OF THE INVENTION

It is a first object of this invention to provide an improved method of recording a digital signal.

It is a second object of this invention to provide an improved apparatus for recording a digital signal.

It is a third object of this invention to provide an improved method of reproducing a digital signal.

It is a fourth object of this invention to provide an improved apparatus for reproducing a digital signal.

It is a fifth object of this invention to provide an improved method of recording and reproducing a digital signal.

It is a sixth object of this invention to provide an improved apparatus for recording and reproducing a digital signal.

It is a seventh object of this invention to provide an improved recording medium which stores a digital signal.

A first aspect of this invention provides a method of recording a digital signal which comprises the steps of recording a digital signal along tracks on a recording medium, the tracks each having plural areas, wherein a portion of the digital signal which is recorded on a first area out of the plural areas includes information for reproduction of the digital signal: and recording said information also on at least one of second areas out of the plural areas, the second areas being greater in size than the first area.

A second aspect of this invention provides a method of recording a digital signal which comprises the steps of recording a digital signal along tracks on a recording medium, the tracks each having a subcode area and a main data area, the main data area being greater in size than the subcode area, wherein the digital signal includes subcode header information which is recorded on the subcode area; and recording the subcode header information also on each of data blocks in the main data area.

A third aspect of this invention provides a method of reproducing a digital signal which comprises the steps of reading out a digital signal from tracks on a recording medium, the tracks each having plural areas; recovering first information from a first portion of the digital signal which is read out from a first area out of the plural areas, the first information being for reproduction of the digital signal; and in cases where the first information fails to be recovered from the first portion of the digital signal which is read out from the first area, recovering second information from a second portion of the digital signal which is read out from at least one of second areas out of the plural areas, the second information being equal in contents to the first information, the second areas being greater in size than the first area.

A fourth aspect of this invention provides a method of reproducing a digital signal which comprises the steps of reading out a digital signal from tracks on a recording medium, the tracks each having a subcode area and a main data area, the main data area being greater in size than the subcode area; recovering subcode header information from a first portion of the digital signal which is read out from the subcode area, the subcode header information being for reproduction of the digital signal; and in cases where the subcode header information fails to be recovered from the first portion of the digital signal which is read out from the subcode area, recovering second information from a second portion of the digital signal which is read out from the main data area, the second information being equal in contents to the subcode header information.

A fifth aspect of this invention is based on the second aspect thereof, and provides a method wherein the subcode header information represents a format of a portion of the digital signal which is recorded on the main data area, the format being changeable among plural predetermined formats.

A sixth aspect of this invention is based on the second aspect thereof, and provides a method wherein the subcode header information is also recorded on a header of each of the data blocks in the main data area.

A seventh aspect of this invention provides a method of recording and reproducing a digital signal which comprises the steps of reading out a digital signal from tracks on a recording medium, the tracks each having plural areas; recovering first information from a first portion of the digital signal which is read out from a first area out of the plural areas, the first information being for reproduction of the digital signal; in cases where the first information fails to be recovered from the first portion of the digital signal which is read out from the first area, recovering second information from a second portion of the digital signal which is read out from at least one of second areas out of the plural areas, the second information being equal in contents to the first information, the second areas being greater in size than the first area; and in cases where the first information fails to be recovered from the first portion of the digital signal which is read out from the first area, recording the recovered second information being equal to the first information on the first area.

An eighth aspect of this invention provides an apparatus for recording a digital signal which comprises means for recording a digital signal along tracks on a recording medium, the tracks each having plural areas, wherein a portion of the digital signal which is recorded on a first area out of the plural areas includes information for reproduction of the digital signal; and means for recording said information also on at least one of second areas out of the plural areas, the second areas being greater in size than the first area.

A ninth aspect of this invention provides an apparatus for recording a digital signal which comprises means for recording a digital signal along tracks on a recording medium, the tracks each having a subcode area and a main data area, the main data area being greater in size than the subcode area, wherein the digital signal includes subcode header information which is recorded on the subcode area; and means for recording the subcode header information also on each of data blocks in the main data area.

A tenth aspect of this invention provides an apparatus for reproducing a digital signal which comprises means for reading out a digital signal from tracks on a recording medium, the tracks each having plural areas; means for recovering first information from a first portion of the digital signal which is read out from a first area out of the plural areas, the first information being for reproduction of the digital signal; and means for, in cases where the first information fails to be recovered from the first portion of the digital signal which is read out from the first area, recovering second information from a second portion of the digital signal which is read out from at least one of second areas out of the plural areas, the second information being equal in contents to the first information, the second areas being greater in size than the first area.

An eleventh aspect of this invention provides an apparatus for reproducing a digital signal which comprises means for reading out a digital signal from tracks on a recording medium, the tracks each having a subcode area and a main data area, the main data area being greater in size than the subcode area; means for recovering subcode header information from a first portion of the digital signal which is read out from the subcode area, the subcode header information being for reproduction of the digital signal; and means for, in cases where the subcode header information fails to be recovered from the first portion of the digital signal which is read out from the subcode area, recovering second information from a second portion of the digital signal which is read out from the main data area, the second information being equal in contents to the subcode header information.

A twelfth aspect of this invention is based on the ninth aspect thereof, and provides an apparatus wherein the subcode header information represents a format of a portion of the digital signal which is recorded on the main data area, the format being changeable among plural predetermined formats.

A thirteenth aspect of this invention is based on the ninth aspect thereof, and provides an apparatus wherein the subcode header information is also recorded on a header of each of the data blocks in the main data area.

A fourteenth aspect of this invention provides an apparatus for recording and reproducing a digital signal which comprises means for reading out a digital signal from tracks on a recording medium, the tracks each having plural areas; means for recovering first information from a first portion of the digital signal which is read out from a first area out of the plural areas, the first information being for reproduction of the digital signal; means for, in cases where the first information fails to be recovered from the first portion of the digital signal which is read out from the first area, recovering second information from a second portion of the digital signal which is read out from at least one of second areas out of the plural areas, the second information being equal in contents to the first information, the second areas being greater in size than the first area; and means for, in cases where the first information fails to be recovered from the first portion of the digital signal which is read out from the first area, recording the recovered second information being equal to the first information on the first area.

A fifteenth aspect of this invention provides a recording medium comprising tracks along which a digital signal is recorded, the tracks each having plural areas, wherein a portion of the digital signal which is recorded on a first area out of the plural areas includes information for reproduction of the digital signal, said information being recorded also on at least one of second areas out of the plural areas, the second areas being greater in size than the first area.

BRIEF DESCRIPTION OF THE DRAWINGS

FIG. 9 is a diagram of information pieces represented by subcode headers.

FIG. 11 is another diagram of the information pieces represented by the main headers of the sync blocks in the main data area.

FIG. 12 is a diagram of information pieces represented by a main header of a sync block in the main data area.

FIG. 19 is a time-domain diagram of signals in the recording and reproducing system of FIG. 14.

DESCRIPTION OF THE PREFERRED EMBODIMENTS

First Embodiment

Figure 1:
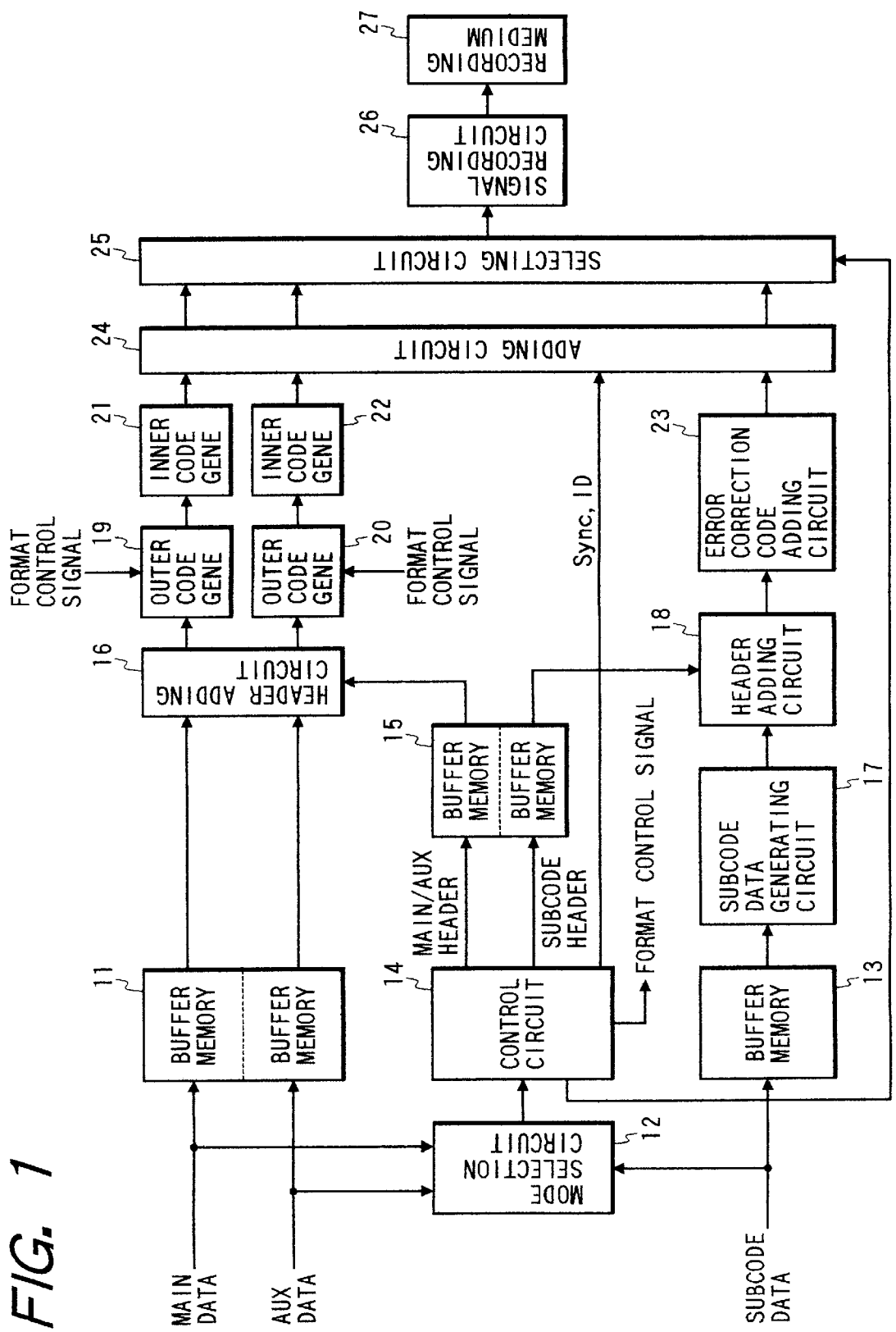
FIG. 1 is a block diagram of a recording system according to a first embodiment of this invention.

FIG. 1 shows a recording system according to a first embodiment of this invention. With reference to FIG. 1, main data and auxiliary data (AUX data) are fed to a buffer memory 11 before being temporarily stored therein. The main data and the AUX data are also fed to a mode selection circuit 12. The AUX data contains an audio signal or another signal.

The structure of a sync block in the AUX data is the same as that in the main data. The AUX data and the main data are substantially equal in physical structure. Accordingly, the AUX data can be regarded as second main data. Thus, later descriptions of the main data can also be applied to the AUX data.

Subcode data is fed to the mode selection circuit 12. In addition, the subcode data is fed to a buffer memory 13 before being temporarily stored therein.

Operation of the recording system of FIG. 1 can be changed among different modes including first and second predetermined modes. First and second predetermined track formats are assigned to the first and second predetermined operation modes respectively. During operation of the recording system in the first predetermined mode, a digital signal is recorded on a recording medium 27 in the first predetermined track format. During operation of the recording system in the second predetermined mode, a digital signal is recorded on the recording medium 27 in the second predetermined track format.

The mode selection circuit 12 generates a mode control signal in response to the main data, the AUX data, and the subcode data. The mode control signal provides a selection of one out of the first and second predetermined modes of operation of the recording system. When the mode selection circuit 12 detects the presence of the main data and the subcode data and the absence of the AUX data, the mode selection circuit 12 sets the mode control signal into a state for selecting the first predetermined mode of operation of the recording system. When the mode selection circuit 12 detects the presence of all the main data, the AUX data, and the subcode data, the mode selection circuit 12 sets the mode control signal into a state for selecting the second predetermined mode of operation of the recording system. The mode selection circuit 12 outputs the mode control signal to a control circuit 14.

The mode selection circuit 12 includes sections for detecting the presence and the absence of the main data, the AUX data, and the subcode data respectively. The mode selection circuit 12 also includes a logic gate or a logic gate array for generating the mode control signal in response to the output signals of the detecting sections.

During operation of the recording system in the second predetermined mode corresponding to the second predetermined track format, the AUX data is recorded on the recording medium 27 as data independent of the main data. During operation of the recording system in the first predetermined mode corresponding to the first predetermined track format, the AUX data is inhibited from being recorded on the recording medium 27.

The recording medium 27 includes, for example, a magnetic tape. The recording system of FIG. 1 includes a magnetic-tape scanning portion of a magnetic recording and reproducing apparatus (for example, a video tape recorder, that is, a VTR) of a helical scan type. Specifically, two magnetic heads having different azimuth angles are mounted on a rotary drum at diametrically opposed positions respectively, and the magnetic tape 27 is wound on the rotary drum in an angular range of about 180 degrees. The magnetic tape 27 in contact with the rotary drum extends along a part of a helix with respect to the rotary drum. The magnetic tape 27 is driven at a constant speed relative to the rotary drum or the magnetic heads. A digital signal is recorded on the magnetic tape 27 via the magnetic heads. Specifically, the digital signal is recorded along tracks formed on the magnetic tape 27. As a result of the helical scan, the magnetic tape 27 is formed with an array of obliquely-extending tracks. Basically, a plurality of data areas of a given capacity or a given size compose each track. The data areas are referred to as the sync blocks corresponding to data blocks.

The first predetermined mode of operation of the recording system is referred to as the normal recording mode. On the other hand, the second predetermined mode of operation of the recording system is referred to as the AUX recording mode.

Figure 2:
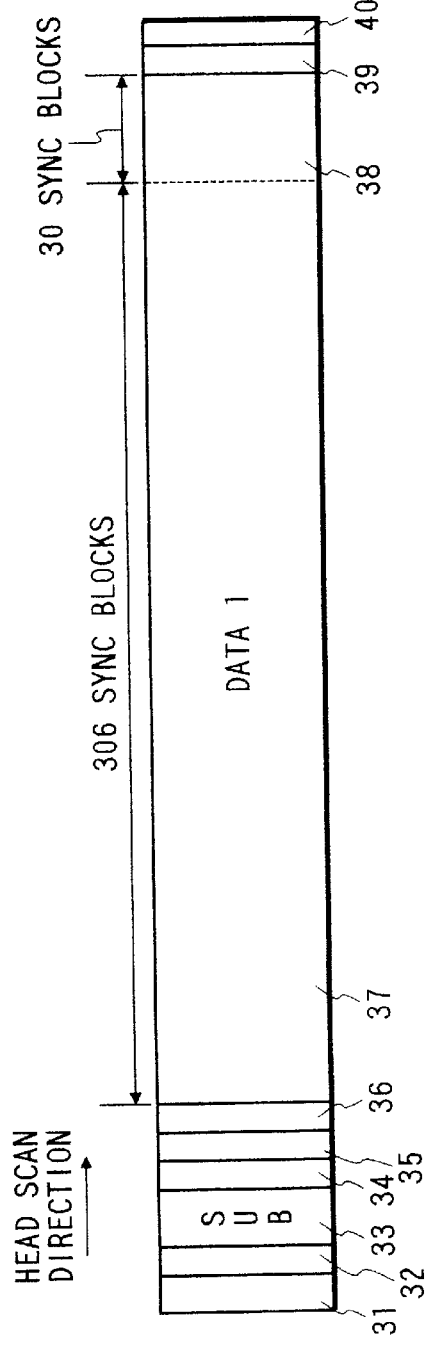
FIG. 2 is a diagram of a track format which occurs during a normal recording mode of operation of the recording system in FIG. 1.

FIG. 2 shows the structure of one track of the first predetermined track format which corresponds to the normal recording mode of operation of the recording system. With reference to FIG. 2, one track has a sequence of a margin area 31, a preamble area 32, a subcode area 33, a postamble area 34, an IBG area 35, a preamble area 36, a data area 37, an error correction code area 38, a postamble area 39, and a margin area 40. The data area 37 and the error correction code area 38 compose a main data area. The data area 37 records 306 sync blocks representing a digital signal DATA1 (normal data or special data). The error correction code area 38 records 30 sync blocks representing an outer error correction code signal (a C3 code signal). The preamble area 32, the subcode area 33, and the postamble area 34 record preamble data, subcode data, and postamble data respectively. The IBG area 35 records IBG data providing an inter-block gap between a subcode data zone and a main data zone. The preamble area 36 and the postamble area 39 record preamble data and postamble data respectively.

Figure 3:
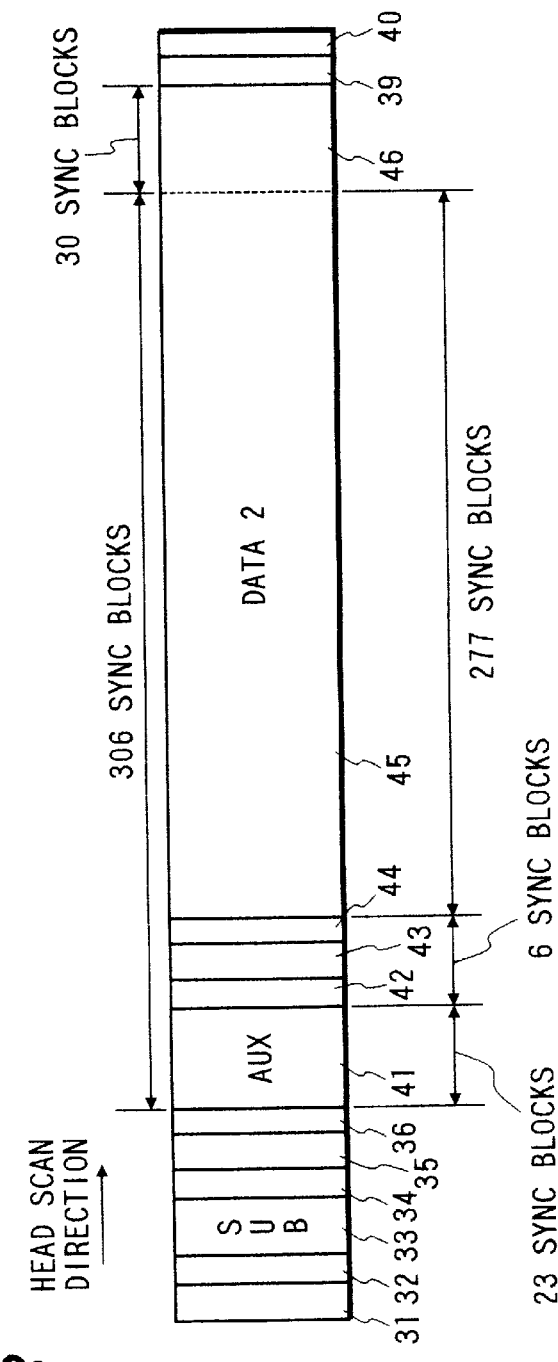
FIG. 3 is a diagram of a track format which occurs during an AUX recording mode of operation of the recording system in FIG. 1.

FIG. 3 shows the structure of one track of the second predetermined track format which corresponds to the AUX recording mode of operation of the recording system. With reference to FIG. 3, one track has a sequence of a margin area 31, a preamble area 32, a subcode area 33, a postamble area 34, an IBG area 35, a preamble area 36, a first data area 41, a postamble area 42, an IBG area 43, a preamble area 44, a second data area 45, an error correction code area 46, a postamble area 39, and a margin area 40. The margin area 31, the preamble area 32, the subcode area 33, the postamble area 34, the IBG area 35, the preamble area 36, the postamble area 39, and the margin area 40 in FIG. 3 are similar to those in FIG. 2. The IBG area 35 provides an inter-block gap between a subcode data zone and an AUX data zone.

The first data area 41, the postamble area 42, the IBG area 43, the preamble area 44, and the second data area 45 record 306 sync blocks similarly to the data area 37 in FIG. 2. The first data area 41 records 23 sync blocks representing the AUX data. The postamble area 42 records 2 sync blocks representing postamble data. The IBG area 43 records 3 sync blocks representing IBG data. The preamble area 44 records one sync block representing preamble data. The postamble area 42, the IBG area 43, and the preamble area 44 compose an editing gap area having 6 sync blocks. The IBG area 43 provides an inter-block gap between the AUX data zone and a main data zone.

The second data area 45 record 277 sync blocks representing a digital signal DATA2 (normal data or special data). The error correction code area 46 records 30 sync blocks representing an outer error correction code signal (a C3 code signal) for correcting an error or errors in the digital signal DATA2. The error correction code signal in the area 46 is generated from 306-sync-block data composed of the 277-sync-block digital signal DATA2 and 29-sync-block data of "0".

Figure 4:
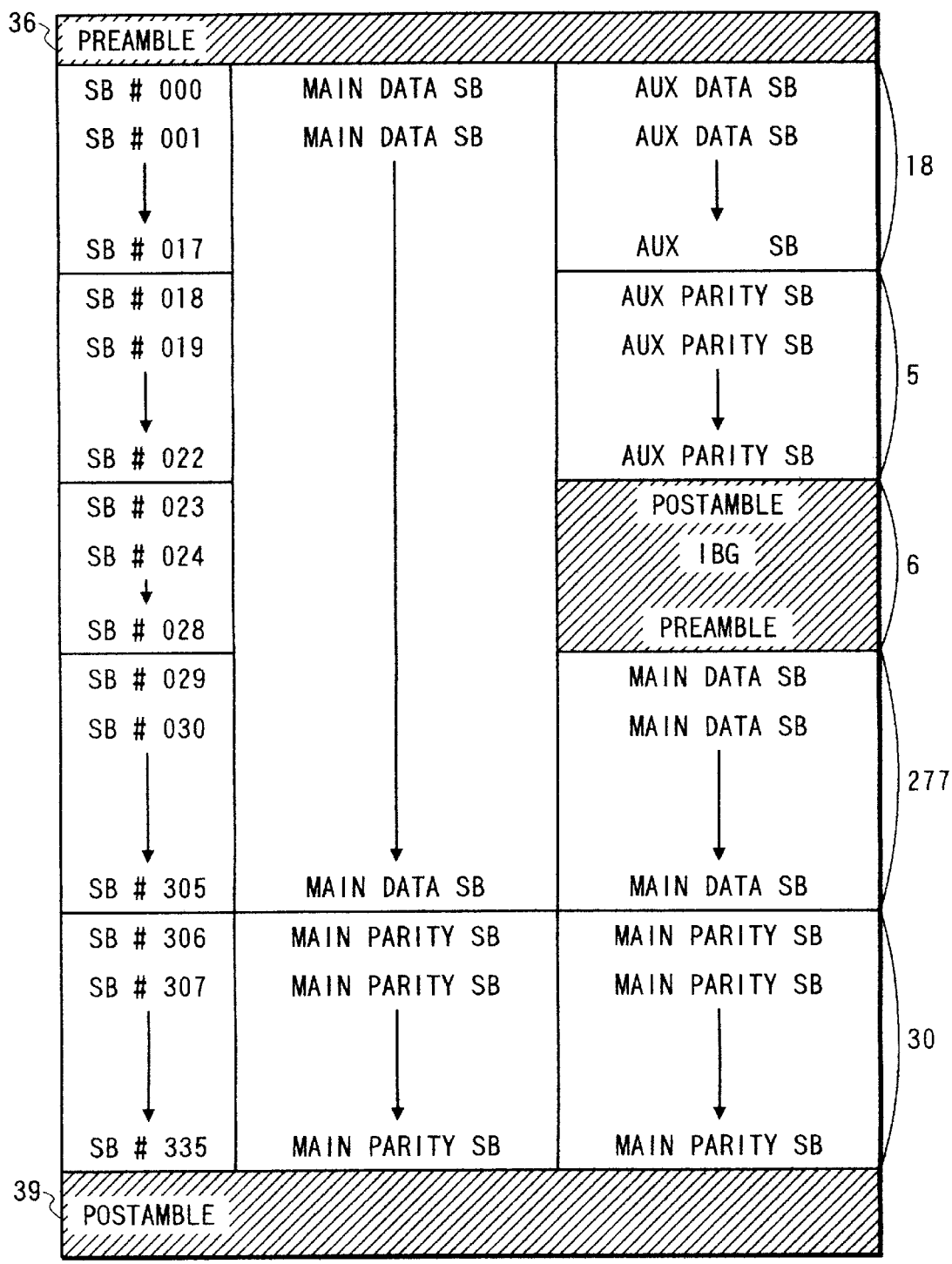
FIG. 4 is a diagram of a combination of the track formats in FIGS. 2 and 3.

FIG. 4 shows the structure of one track of the first predetermined track format which corresponds to the normal recording mode of operation of the recording system, and also the structure of one track of the second predetermined track format which corresponds to the AUX recording mode of operation of the recording system. In FIG. 4, "SB" denotes a sync block, and the numerals in the right-hand side of the drawing denote the numbers of sync blocks in divided areas in one track. In FIG. 4, serial order numbers #000,

001, #002, . . . , d #335 are sequentially given to 336 sync blocks occupying the region between the preamble area 36 and the postamble area 39 in one track respectively.

With reference to FIG. 4, in one track of the first predetermined track format which corresponds to the normal recording mode of operation of the recording system, 306 successive sync blocks having order numbers of #000 to #305 are used to represent main data. Further, 30 successive sync blocks having order numbers of #306 to #335 are used to represent main parities.

With reference to FIGS. 3 and 4, in one track of the second predetermined track format which corresponds to the AUX recording mode of operation of the recording system, 18 successive sync blocks having order numbers of #000 to #017 are used to represent AUX data. In addition, 5 successive sync blocks having order numbers of #018 to #022 are used to represent AUX parities. Further, 277 successive sync blocks having order numbers of #029 to #305 are used to represent main data. Finally, 30 successive sync blocks having order numbers of #306 to #335 are used to represent main parities. It should be noted that hatched regions in FIG. 4 are void of effective sync blocks.

Figure 5:
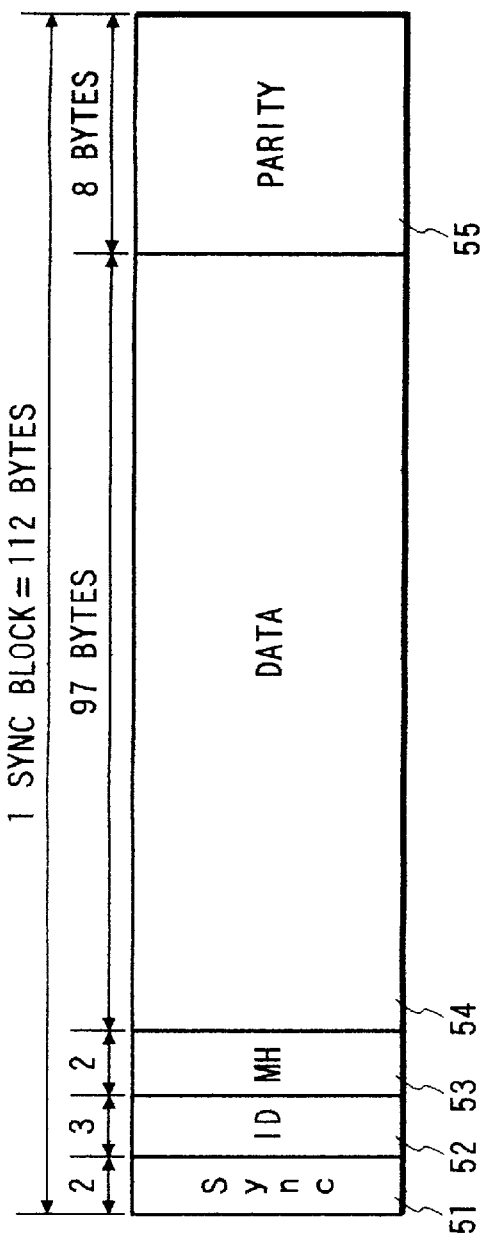
FIG. 5 is a diagram of a main data block.

FIG. 5 shows an example of a format of one sync block in the main data areas 37 and 45. As shown in FIG. 5, one sync block corresponds to 112 bytes in capacity (size), and has a sequence of sub areas 51, 52, 53, 54, and 55. The first sub area 51 has 2 bytes, and contains a sync signal. The second sub area 52 has 3 bytes, and contains address information. The address information is also referred to as the identification (ID) information. The third sub area 53 has 2 bytes, and contains format information. The third sub area 53 is referred to as the main header region MH. The fourth sub area 54 has 97 bytes, and contains various information pieces. The fourth sub area 54 is referred to as the data storing region. The fifth sub area 55 has 8 bytes, and contains parities for correcting an error or errors in the information represented by the other sub areas 51–54.

For example, a digital signal in a transport packet (TP) transmission system of MPEG2 (Moving Picture Experts Group 2) is handled as normal data or special data, and every segment of the digital signal is recorded on the data storing regions 54 of two sync blocks.

Figure 6:
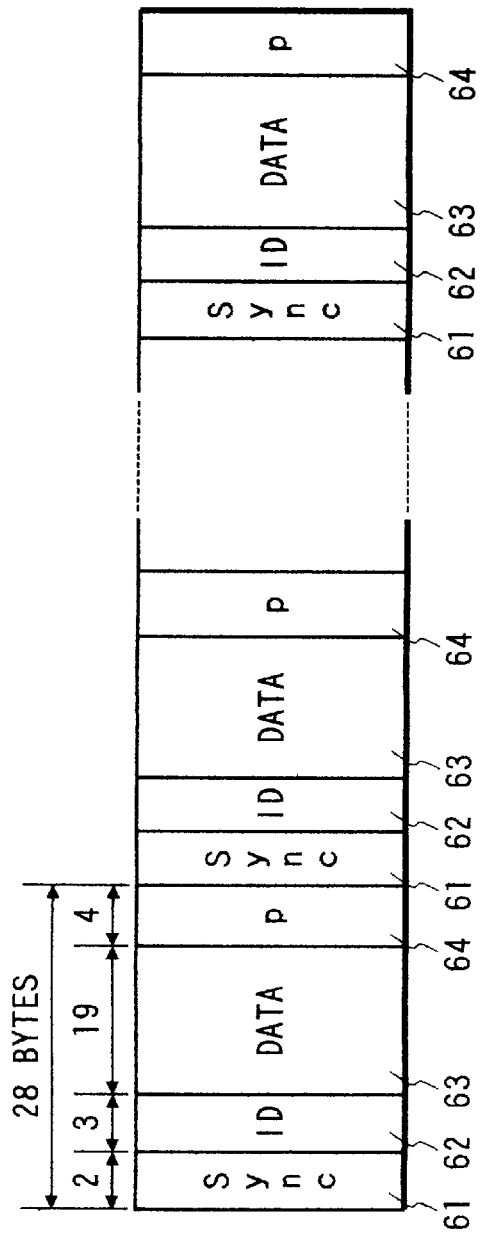
FIG. 6 is a diagram of a subcode data block.

FIG. 6 shows an example of a format of the subcode area 33. As shown in FIG. 6, the subcode area corresponds to 448 bytes in capacity (size), and has a sequence of 16 blocks (subcode data blocks) each with 28 bytes. Each of the 28-byte blocks (the subcode data blocks) has a sequence of sub areas 61, 62, 63, and 64. The first sub area 61 has 2 bytes, and contains a sync signal. The second sub area 62 has 3 bytes, and contains address information. The address information is also referred to as the identification (ID) information. The identification information has a sequence of three identification information pieces ID1, ID2, and ID3. The third sub area 63 has 19 bytes, and contains data (subcode data). The first byte in the third sub area 63 represents a subcode header while the second and later bytes therein represent subcode data. The third sub area 63 is referred to as the subcode data region. The fourth sub area 64 has 4 bytes, and contains parities for correcting an error or errors in the information represented by the other sub areas 61–63. The fourth sub area 64 is referred to as the subcode parity region.

With reference back to FIGS. 2 and 3, subcode data in the subcode area 33 represents information pieces related to main data in the data areas 37 and 45 following the subcode area 33. For example, the subcode data contains an information piece representing the format of the main data, an information piece representing a table of the contents of the main data, and an information piece representing the recording date of the main data.

This embodiment features that the main header region (the third sub area) 53 in each of given sync blocks in the main data area 37 or 45 records the information same as track format information recorded on the subcode data region 63 in the immediately-preceding subcode area 33.

Figure 7:
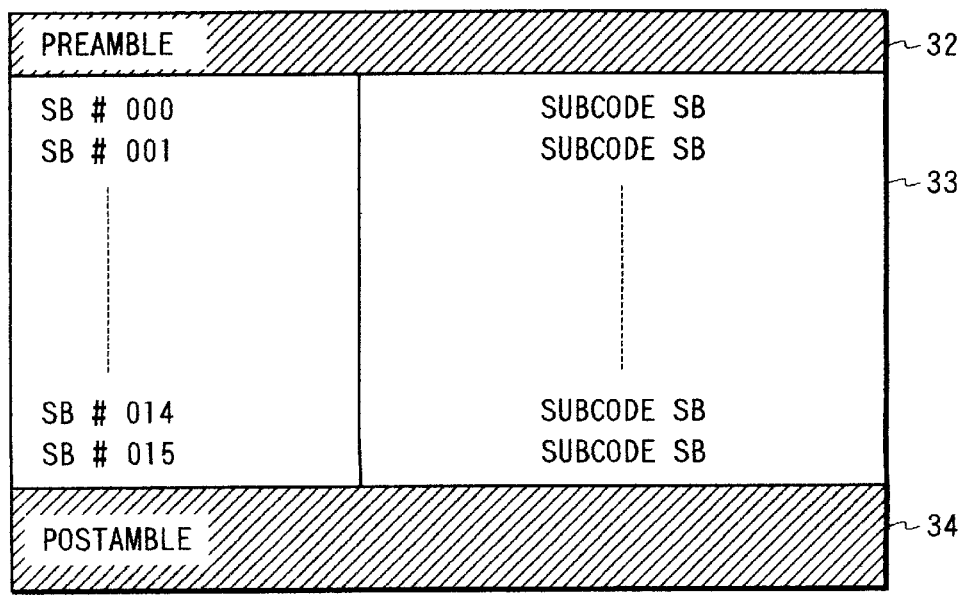
FIG. 7 is a diagram of a structure of subcode areas in FIGS. 2 and 3.

FIG. 7 shows an example of a format of the subcode area 33. With reference to FIG. 7, the subcode area 33 extends between the preamble area 32 and the postamble area 34. In FIG. 4, "SB" denotes a 28-byte block (a subcode data block). As shown in FIG. 7, the subcode area 33 has a sequence of 16 subcode data blocks. Serial order numbers #000, #001, #002, . . . , and #015 are sequentially given to the 16 subcode data blocks in the subcode area 33 respectively.

Figure 8:
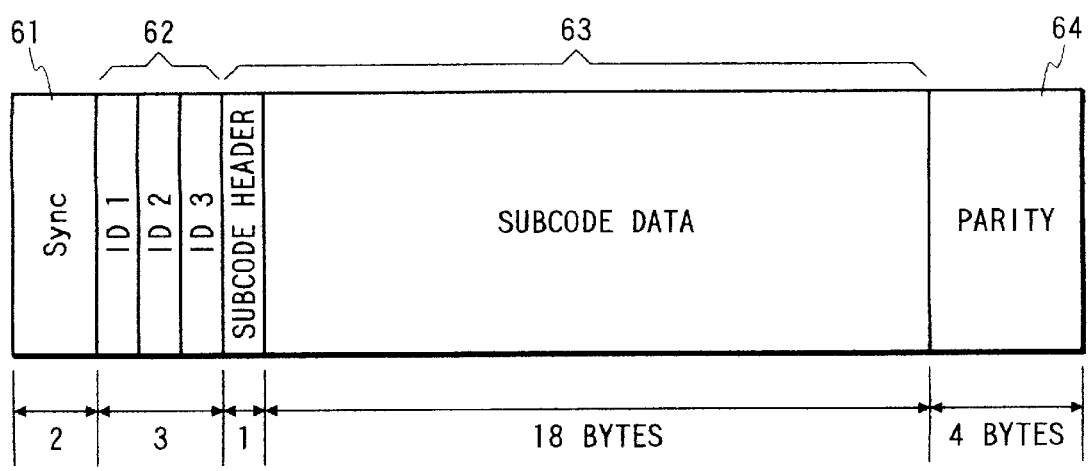
FIG. 8 is a diagram of a format of a subcode data block.

FIG. 8 shows an example of a format of one 28-byte block (one subcode data block) in the subcode area 33. With reference to FIG. 8, one subcode data block has a sequence of sub areas 61, 62, 63, and 64. The first sub area 61 has 2 bytes, and contains a sync signal. The second sub area 62 has 3 bytes, and contains address information. The address information is also referred to as the identification (ID) information. The identification information has a sequence of three identification information pieces ID1, ID2, and ID3. The third sub area 63 has 19 bytes. The first byte in the third sub area 63 represents a subcode header while the second and later bytes therein represent subcode data. The third sub area 63 is referred to as the subcode data region. The fourth sub area 64 has 4 bytes, and contains parities for correcting an error or errors in the information represented by the other sub areas 61–63. The fourth sub area 64 is referred to as the subcode parity area.

With reference to FIG. 9, subcode headers in successive subcode data blocks sequentially and cyclically represent a format ID 71, an information piece "1", an information piece "2", and an information piece "3". Each of the format ID 71, the information piece "1", the information piece "2", and the information piece "3" has 8 bits (one byte). The period of one cycle of the subcode headers corresponds to four subcode data blocks in the subcode area 33. Specifically, the subcode header in a first subcode data block represents the format ID 71. The subcode header in a second subcode data block represents the information piece "1". The subcode header in a third subcode data block represents the information piece "2". The subcode header in a fourth subcode data block represents the information piece "3". Similarly, the subcode headers in later subcode data blocks sequentially and cyclically represent the format ID 71, the information piece "1", the information piece "2", and the information piece "3". The format ID 71 is 8-bit format information representing whether the format of a related track results from the normal recording mode of operation of the recording system or the AUX recording mode of operation of the recording system. The information piece "1", the information piece "2", and the information piece "3" are assigned to reserved zones 72, 73, and 74 respectively.

In connection with FIG. 9, general expressions are as follows. The subcode header in each of subcode data blocks with order numbers of 4n represents the format ID 71 where "n" denotes natural numbers in a given range. The subcode header in each of subcode data blocks with order numbers of 4n+1 represents the information piece "1". The subcode header in each of subcode data blocks with order numbers of 4n+2 represents the information piece "2". The subcode header in each of subcode data blocks with order number of 4n+3 represents the information piece "3".

With reference back to FIG. 1, the control circuit 14 periodically generates header information for main data and AUX data, subcode header information, a format control signal, a sync signal, identification (ID) information, and read control signals in response to the mode control signal outputted from the mode selection circuit 12. The header information for main data and AUX data, that is, the main header information, contains a copy of the subcode header information. The format control signal represents which of the first predetermined track format (corresponding to the normal recording mode of operation of the recording system) and the second predetermined track format (corresponding to the AUX recording mode of operation of the recording system) is required. The read control signals are fed from the control circuit 14 to the buffer memories 11 and 13 and a buffer memory 15 to control the reading of data from the buffer memories 11, 13, and 15 respectively.

The control circuit 14 may include a microcomputer or a similar device having a combination of a CPU, an input/output port, a ROM, and a RAM. In this case, the control circuit 14 operates in accordance with a program stored in the ROM.

The header information for main data and AUX data, that is, the main header information, is transmitted from the control circuit 14 to a header adding circuit 16 via the buffer memory 15. The main data and the AUX data are read out from the buffer memory 11 before being fed to the header adding circuit 16. The device 16 periodically adds the header information to each of the main data and the AUX data. The header adding circuit 16 outputs the resultant main data and the resultant AUX data to outer code generating circuits 19 and 20 respectively.

The subcode header information generated by the control circuit 14 has the structure in FIG. 9. The subcode header information is transmitted from the control circuit 14 to a header adding circuit 18 via the buffer memory 15. The subcode data is read out from the buffer memory 13 before being fed to a subcode data generating circuit 17. The device 17 generates second subcode data on the basis of the subcode data read out from the buffer memory 13. The subcode data generating circuit 17 outputs the second subcode data to the header adding circuit 18. The device 18 adds the subcode header information to the second subcode data. The header adding circuit 18 outputs the resultant subcode data to an error correction code adding circuit 23.

Figure 10:
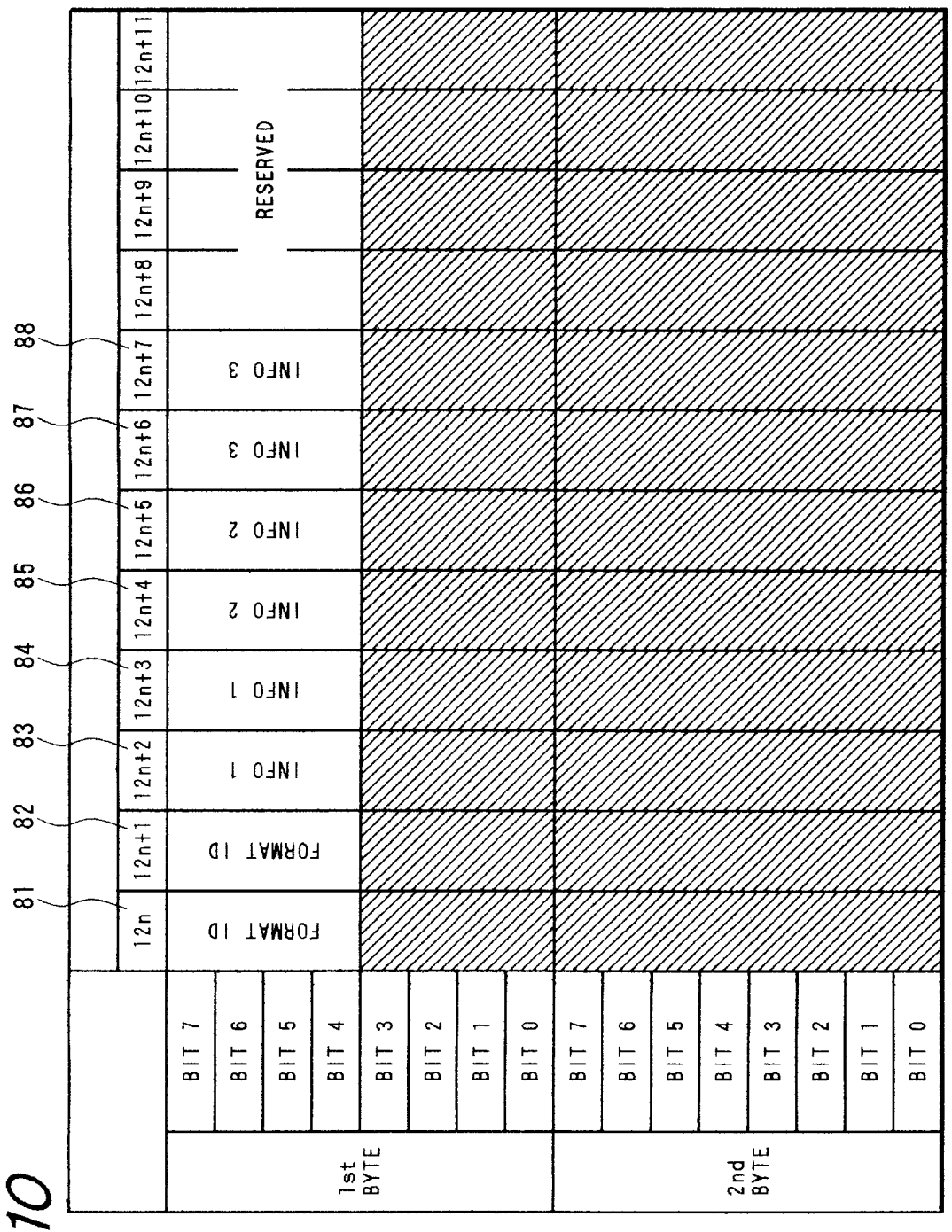
FIG. 10 is a diagram of information pieces represented by main headers of sync blocks in a main data area.

The header data for the main data and the AUX data is placed in the main header region (the third sub area) 53 in FIG. 5. The header data for the main data and the AUX data has a copy of the subcode header information (that is, the format ID 71, the information piece "1", the information piece "2", and the information piece "3" in FIG. 9). FIG. 10 shows an example of the structure of the header data for the main data and the AUX data. As shown in FIG. 10, the header data for the main data and the AUX data has a first byte and a second byte. With reference to FIG. 10, four former bits (bits "7", "6", "5", and "4") of a first byte in main header data in a first sync block 81 represent a first half of the format ID (the format ID 71 in FIG. 9). Four former bits (bits "7", "6", "5", and "4") of a first byte in main header data in a second sync block 82 represent a second half of the format ID (the format ID 71 in FIG. 9). Four former bits (bits "7", "6", "5", and "4") of a first byte in main header data in a third sync block 83 represent a first half of the information piece "1" (see FIG. 9). Four former bits (bits "7", "6", "5", and "4") of a first byte in main header data in a fourth sync block 84 represent a second half of the information piece "1" (see FIG. 9). Four former bits (bits "7", "6", "5", and "4") of a first byte in main header data in a fifth sync block 85 represent a first half of the information piece "2" (see FIG. 9). Four former bits (bits "7", "6", "5", and "4") of a first byte in main header data in a sixth sync block 86 represent a second half of the information piece "2" (see FIG. 9). Four former bits (bits "7", "6", "5", and "4") of a first byte in main header data in a seventh sync block 87 represent a first half of the information piece "3" (see FIG. 9). Four former bits (bits "7", "6", "5", and "4") of a first byte in main header data in an eighth sync block 88 represent a second half of the information piece "3" (see FIG. 9). Four former bits (bits "7", "6", "5", and "4") of a first byte in main header data in a ninth sync block 89 are assigned to a reserved area. Four former bits (bits "7", "6", "5", and "4") of a first byte in main header data in a tenth sync block 90 are assigned to a reserved area. Four former bits (bits "7", "6", "5", and "4") of a first byte in main header data in an eleventh sync block 91 are assigned to a reserved area. Four former bits (bits "7", "6", "5", and "4") of a first byte in main header data in a twelfth sync block 92 are assigned to a reserved area. Similarly, four former bits of a first byte in main header data in each of later sync blocks sequentially and cyclically represent the format ID, the information piece "1", the information piece "2", the information piece "3", and the reserved area. It should be noted that the hatched portions in FIG. 10 are used for other information.

In connection with FIG. 10, general expressions are as follows. Four former bits of a first byte in main header data in each of sync blocks with order numbers of 12n represent a first half of the format ID where "n" denotes natural numbers in a given range. Four former bits of a first byte in main header data in each of sync blocks with order numbers of 12n+1 represent a second half of the format ID. Four former bits of a first byte in main header data in each of sync blocks with order numbers of 12n+2 represent a first half of the information piece "1". Four former bits of a first byte in main header data in each of sync blocks with order numbers of 12n+3 represent a second half of the information piece "1". Four former bits of a first byte in main header data in each of sync blocks with order numbers of 12n+4 represent a first half of the information piece "2". Four former bits of a first byte in main header data in each of sync blocks with order numbers of 12n+5 represent a second half of the information piece "2". Four former bits of a first byte in main header data in each of sync blocks with order numbers of 12n+6 represent a first half of the information piece "3". Four former bits of a first byte in main header data in each of sync blocks with order numbers of 12n+7 represent a second half of the information piece "3". Four former bits of a first byte in main header data in each of sync blocks with order numbers of 12n+8 are assigned to a reserved area. Four former bits of a first byte in main header data in each of sync blocks with order numbers of 12n+9 are assigned to a reserved area. Four former bits of a first byte in main header data in each of sync blocks with order numbers of 12n+10 are assigned to a reserved area. Four former bits of a first byte in main header data in each of sync blocks with order numbers of 12n+11 are assigned to a reserved area.

As shown in FIG. 11, four former bits (bits "7", "6", "5", and "4") of a first byte in main header data in a first sync block represent bits "7", "6", "5", and "4" of the format ID respectively while four former bits (bits "7", "6", "5", and "4") of a first byte in main header data in a second sync block represent bits "3", "2", "1", and "0" of the format ID respectively. Four former bits (bits "7", "6", "5", and "4") of a first byte in main header data in a third sync block represent bits "7", "6", "5", and "4" of the information piece "1" respectively while four former bits (bits "7", "6", "5", and "4") of a first byte in main header data in a fourth sync block represent bits "3", "2", "1", and "0" of the information piece "1" respectively. Four former bits (bits "7", "6", "5", and "4") of a first byte in main header data in a fifth sync block represent "7", "6", "5", and "4" of the information piece "2" respectively while four former bits (bits "7", "6", "5", and "4") of a first byte in main header data in a sixth sync block represent bits "3", "2", "1", and "0" of the information piece "2" respectively. Four former bits (bits "7", "6", "5", and "4") of a first byte in main header data in a seventh sync block represent "7", "6", "5", and "4" of the information piece "3" respectively while four former bits (bits "7", "6", "5", and "4") of a first byte in main header data in an eighth sync block represent bits "3", "2", "1", and "0" of the information piece "3" respectively.

As shown in FIG. 12, four former bits (bits "7", "6", "5", and "4") of a first byte in the 2-byte main header region 53 correspond to a zone 95 for storing subcode header information. Four latter bits (bits "3", "2", "1", and "0") of the first byte in the 2-byte main header region 53, and eight bits of a second byte therein are used for other information.

As understood from the previous description related to FIGS. 10, 11, and 12, the contents of the subcode header are recurrently arranged in the main data areas 37 and 45 at a period corresponding to 12 sync blocks. Each of 4 bytes of the subcode header is divided into four former bits assigned to a sync block and four latter bits assigned to a subsequent sync block. The whole of the 4-byte subcode header is represented by 8 former sync blocks out of 12 sync blocks.

With reference back to FIG. 1, the header adding circuit 16 periodically generates a combination of the main header and the main data as a 99-byte digital signal. It should be noted that the main header contains the subcode header information. The header adding circuit 16 feeds the 99-byte digital signal to the outer code generating circuit 19. The control circuit 14 outputs the format control signal to the outer code generating circuit 19. The device 19 generates an outer code signal as an error correction code signal for the main data in the area 37 or 45 in response to the format control signal. Specifically, the device 19 periodically generates an error correction code signal for the 306-sync-block main data in the area 37 when the format control signal represents that the first predetermined track format (corresponding to the normal recording mode of operation of the recording system) is required. On the other hand, the device 19 generates an error correction code signal for the 277-sync-block main data in the area 45 when the format control signal represents that the second predetermined track format (corresponding to the AUX recording mode of operation of the recording system) is required. The error correction code signal generated by the device 19 has 30 sync blocks.

In more detail, when the second predetermined track format (corresponding to the AUX recording mode of operation of the recording system) is required, the device 19 periodically generates an error correction code signal for 306 sync blocks corresponding to 29 sync blocks of "0" data plus the 277-sync-block main data in the area 45. The 29 sync blocks of "0" data correspond to the first data area 41, the postamble area 42, the IBG area 43, and the preamble area 44 in FIG. 3. The error correction code signal generated by the device 19 is recorded on the error correction code area 38 in FIG. 2 when the first predetermined track format (corresponding to the normal recording mode of operation of the recording system) is required. The error correction code signal generated by the device 19 is recorded on the error correction code area 46 in FIG. 3 when the second predetermined track format (corresponding to the AUX recording mode of operation of the recording system) is required.

The outer code generating circuit 19 periodically combines the main header, the main data, and the outer code signal (the error correction code signal) into a digital signal fed to an inner code generating circuit 21. The inner code generating circuit 21 periodically generates a 8-byte parity as an inner code signal per 99 bytes of the received digital signal. The inner code generating circuit 21 periodically combines the main header, the main data, the outer code signal, and the inner code signal into a digital signal fed to an adding circuit 24.

The header adding circuit 16 periodically generates a combination of the main header and the AUX data as a 99-byte AUX digital signal. It should be noted that the main header contains the subcode header information. The header adding circuit 16 feeds the 99-byte AUX digital signal to the outer code generating circuit 20. The control circuit 14 outputs the format control signal to the outer code generating circuit 20. The outer code generating circuit 20 is enabled when the format control signal represents that the second predetermined track format (corresponding to the AUX recording mode of operation of the recording system) is required. The device 20 periodically generates an outer code signal having 5 sync blocks per 18 sync blocks of the received AUX digital signal. The outer code generating circuit 20 periodically combines the main header, the AUX data, and the outer code signal into a 23-sync-block AUX digital signal fed to an inner code generating circuit 22. The inner code generating circuit 22 periodically generates a 8-byte parity as an inner code signal per 99 bytes of the received AUX digital signal. The inner code generating circuit 22 periodically combines the main header, the AUX data, the outer code signal, and the inner code signal into an AUX digital signal fed to the adding circuit 24.

The control circuit 14 periodically outputs the sync signal and the identification (ID) information to the adding circuit 24. As previously described, the sync signal has 2 bytes while the identification (ID) information has 3 bytes.

The adding circuit 24 periodically combines the sync signal, the identification (ID) information, the main header, the main data, the outer code signal, and the inner code signal into a main-data sync block. The adding circuit 24 outputs the combination resultant signal to a selecting circuit 25 sync-block by sync-block. Similarly, the adding circuit 24 combines the sync signal, the identification (ID) information, the main header, the AUX data, the outer code signal, and the inner code signal into an AUX data sync block. The adding circuit 24 outputs the combination resultant signal to the selecting circuit 25 sync-block by sync-block.

As previously described, the error correction code adding circuit 23 periodically receives the combination of the second subcode data and the subcode header from the header adding circuit 18. The device 23 periodically generates an error correction code signal for the combination of the second subcode data and the subcode header. The error correction code adding circuit 23 periodically combines the subcode header, the second subcode data, and the error correction code signal. The error correction code adding circuit 23 outputs the combination resultant signal to the adding circuit 24. The adding circuit 24 periodically combines the sync signal, the identification (ID) information, the subcode header, the second subcode data, and the error correction signal into a 28-byte signal block (a subcode data block). The adding circuit 24 outputs the combination resultant signal to the selecting circuit 25 signal-block by signal-block.

The control circuit 14 generates a selection control signal in response to the mode control signal outputted from the mode selection circuit 12. The selection control signal represents which of the first predetermined track format (corresponding to the normal recording mode of operation of the recording system) and the second predetermined track format (corresponding to the AUX recording mode of operation of the recording system) is required. The control circuit 14 outputs the selection control signal to the selecting circuit 25.

The selecting circuit 25 selects at least two out of three output signals of the adding circuit 24 in response to the selection control signal. Specifically, when the selection control signal represents that the first predetermined track format (corresponding to the normal recording mode of operation of the recording system) is required, the selecting circuit 25 selects the output signal of the adding circuit 24 which originates from the output signal of the inner code generating circuit 21 and also the output signal of the adding circuit 24 which originates from the output signal of the error correction code adding circuit 23. Thus, when the first predetermined track format (corresponding to the normal recording mode of operation of the recording system) is required, sync blocks with the main data and 28-byte signal blocks (subcode data blocks) with the subcode data are selected. On the other hand, when the selection control signal represents that the second predetermined track format (corresponding to the AUX recording mode of operation of the recording system) is required, the selecting circuit 25 selects the output signal of the adding circuit 24 which originates from the output signal of the inner code generating circuit 21, the output signal of the adding circuit 24 which originates from the output signal of the inner code generating circuit 22, and the output signal of the adding circuit 24 which originates from the output signal of the error correction code adding circuit 23. Thus, when the second predetermined track format (corresponding to the AUX recording mode of operation of the recording system) is required, sync blocks with the main data, sync blocks with the AUX data, and 28-byte signal blocks (subcode data blocks) with the subcode data are selected.

A signal recording circuit 26 receives the output signal of the selecting circuit 25, that is, the selection resultant signal. The signal recording circuit 26 generates preamble data, postamble data, and IBG data assigned to the preamble area 32, the postamble area 34, and the IBG area 35 respectively. In addition, the signal recording circuit 26 generates preamble data and postamble data assigned to the preamble area 36 and the postamble area 39 respectively. Further, the signal recording circuit 26 generates postamble data, IBG data, and preamble data assigned to the postamble area 42, the IBG area 43, and the preamble area 44 respectively. In the case where the first predetermined track format (corresponding to the normal recording mode of operation of the recording system) is required, the signal recording circuit 26 multiplexes the preamble data assigned to the preamble area 32, the subcode data assigned to the subcode area 33, the postamble data assigned to the postamble area 34, the IBG data assigned to the IBG area 35, the preamble data assigned to the preamble area 36, the main data assigned to the data area 37, the outer error correction code signal assigned to the error correction code area 38, and the postamble data assigned to the postamble area 39. The signal recording circuit 26 subjects the multiplexing-resultant signal to modulation and amplification before recording the modulation/amplification-resultant signal on the recording medium (the magnetic tape) 27 via the magnetic heads. In this case, each track on the recording medium (the magnetic tape) 27 has the format shown in FIG. 2. In the case where the second predetermined track format (corresponding to the AUX recording mode of operation of the recording system) is required, the signal recording circuit 26 multiplexes the preamble data assigned to the preamble area 32, the subcode data assigned to the subcode area 33, the postamble data assigned to the postamble area 34, the IBG data assigned to the IBG area 35, the AUX data assigned to the first data area 41, the postamble data assigned to the postamble area 42, the IBG data assigned to the IBG area 43, the preamble data assigned to the preamble area 44, the main data assigned to the second data area 45, the outer error correction code signal assigned to the error correction code area 46, and the postamble data assigned to the postamble area 39. The signal recording circuit 26 subjects the multiplexing-resultant signal to modulation and amplification before recording the modulation/amplification-resultant signal on the recording medium (the magnetic tape) 27 via the magnetic heads. In this case, each track on the recording medium (the magnetic tape) 27 has the format shown in FIG. 3.

As previously described, the header data for the main data and the AUX data is placed in the main header region (the third sub area) 53 in FIG. 5. The header data for the main data and the AUX data has a copy of the subcode header information in the subcode area 33. The subcode header information corresponds to the format ID 71, the information piece "1", the information piece "2", and the information piece "3" in FIG. 9. Four bits out of every 2-byte header data for the main data and the AUX data are used as a zone loaded with a copy of the subcode header information.

It should be noted that the mode selection circuit 12 may be replaced by a manually-operated switch for generating the mode control signal.

Figure 15:
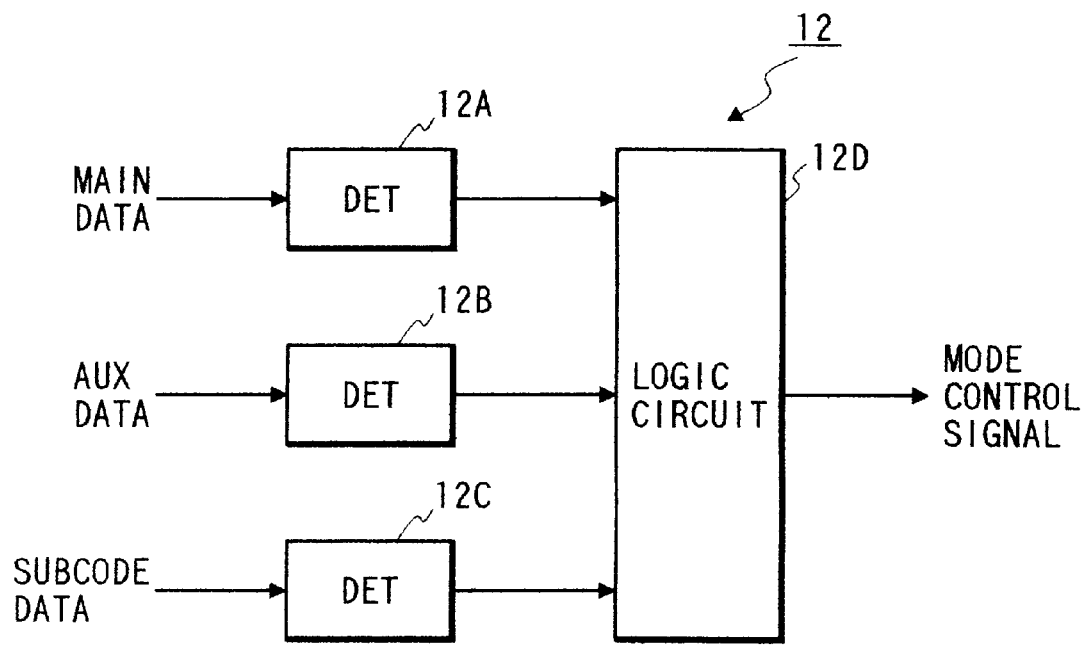
FIG. 15 is a block diagram of a mode selection circuit in FIG. 1.

FIG. 15 shows an example of the mode selection circuit 12. With reference to FIG. 15, the mode selection circuit 12 includes detectors 12A, 12B, and 12C for the main data, the AUX data, and the subcode data respectively. The mode selection circuit 12 also includes a logic circuit 12D having a suitable combination of logic gates. The detector 12A outputs a "1" signal and a "0" signal in the presence and the absence of the main data respectively. The detector 12B outputs a "1" signal and a "0" signal in the presence and the absence of the AUX data respectively. The detector 12C outputs a "1" signal and a "0" signal in the presence and the absence of the subcode data respectively. The logic circuit 12D generates the mode control signal in response to the output signals of the detectors 12A, 12B, and 12C. When the output signal of the detector 12A is "0" and the output signal of the detector 12B is "0", the mode control signal is "0" regardless of the logic state of the output signal of the detector 12C. When the output signal of the detector 12A is "0" and the output signal of the detector 12B is "1", the mode control signal is "0" regardless of the logic state of the output signal of the detector 12C. When the output signal of the detector 12A is "1" and the output signal of the detector 12B is "0", the mode control signal is "0" regardless of the logic state of the output signal of the detector 12C. When the output signal of the detector 12A is "1" and the output signal of the detector 12B is "1", the mode control signal is "1"

regardless of the logic state of the output signal of the detector 12C. The mode control signal being "0" corresponds to the first predetermined mode of operation of the recording system, that is, the normal recording mode of operation of the recording system. The mode control signal being "1" corresponds to the second predetermined mode of operation of the recording system, that is, the AUX recording mode of operation of the recording system.

Figure 16:
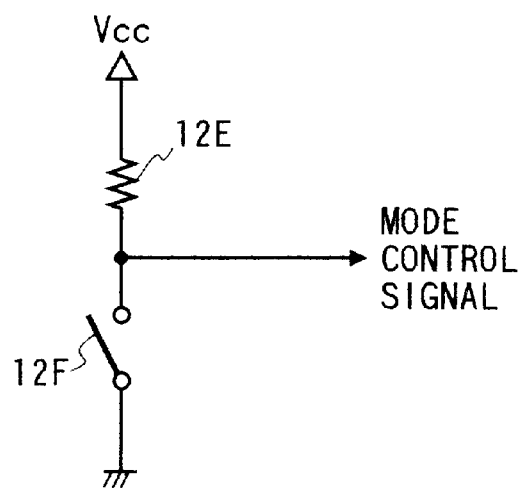
FIG. 16 is a schematic diagram of a switch arrangement.

As previously described, the mode selection circuit 12 may be replaced by a manually-operated switch for generating the mode control signal. FIG. 16 shows an example of such a switch arrangement. With reference to FIG. 16, one end of a resistor 12E is connected to a positive voltage line Vcc. The other end of the resistor 12E is grounded via a manual switch 12F. The mode control signal appears at the junction between the resistor 12E and the switch 12F. When the switch 12F is closed, the mode control signal assumes "0". When the switch 12F is opened, the mode control signal assumes "1".

Figure 17:
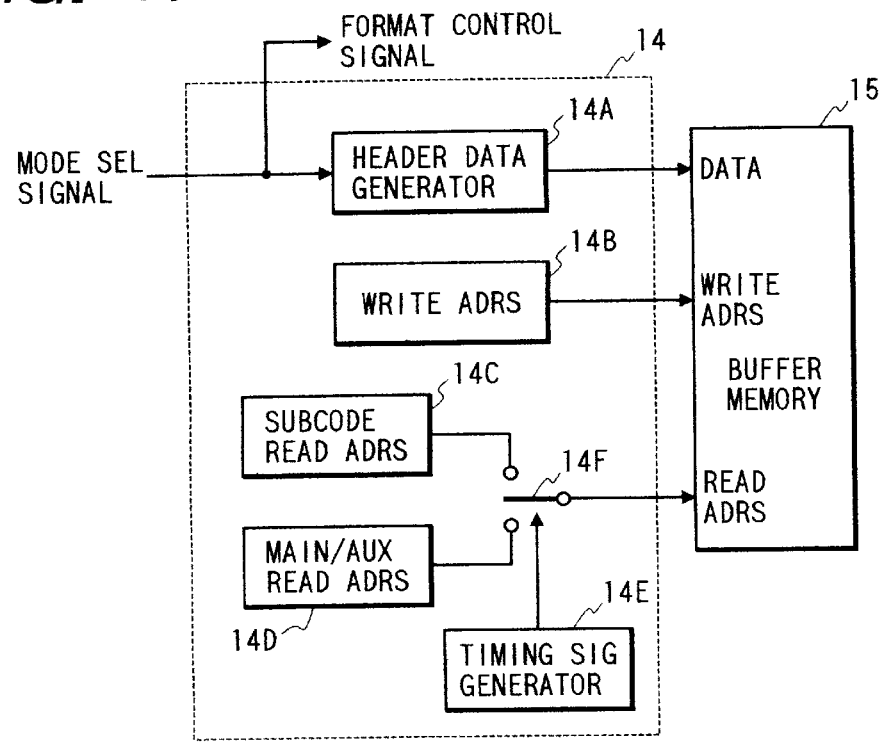
FIG. 17 is a diagram of an example of a part of a control circuit in FIG. 1.

FIG. 17 shows an example of a part of the control circuit 14. With reference to FIG. 17, the control circuit 14 includes a header data generator 14A, a write address generator 14B, a subcode read address generator 14C, a main/AUX read address generator 14D, a timing signal generator 14E, and a switch 14F. The control circuit 14 receives the mode control signal from the mode selection circuit 12. The control circuit 14 outputs the mode control signal as the format control signal. The header data generator 14A periodically outputs header information which depends on the mode control signal. The header information outputted from the header data generator 14A sequentially represents information pieces including the format ID (the format ID 71), the information piece "1", the information piece "2", and the information piece "3". The write address generator 14B outputs a periodically-updated write address signal to the buffer memory 15. The header information outputted from the header data generator 14A is written into the buffer memory 15 in response to the write address signal. The format ID (the format ID 71), the information piece "1", the information piece "2", and the information piece "3" are written into predetermined 8-bit storage segments of the buffer memory 15 respectively. The subcode read address generator 14C outputs a periodically-updated read address signal for the subcode header. The main/AUX read address generator 14D outputs a periodically-updated read address signal for the main/AUX header. The timing signal generator 14E outputs a selection control signal which periodically changes between "0" and "1". The selection control signal is "0" during every interval assigned to subcode data. The selection control signal is "1" during other intervals. The switch 14F receives the read address signal for the subcode header from the subcode read address generator 14C. The switch 14F receives the read address signal for the main/AUX header from the main/AUX read address generator 14D. The switch 14F receives the selection control signal from the timing signal generator 14E. The switch 14F selects one out of the read address signal for the subcode header and the read address signal for the main/AUX header in response to the selection control signal. Specifically, the switch 14F selects the read address signal for the subcode header during every interval assigned to subcode data. The switch 14F selects the read address signal for the main/AUX header during other intervals. The switch 14F transmits the selected read address signal to the buffer memory 15. At least part of the header information is read out from the buffer memory in response to the read address signal selected by the switch 14F. The read address signal for the subcode header is designed so that the header information read out from the buffer memory 15 will be the subcode header information. The read address signal for the main/AUX header is designed so that the header information read out from the buffer memory 15 will be the header information for main data and AUX data.

Second Embodiment

Figure 13:
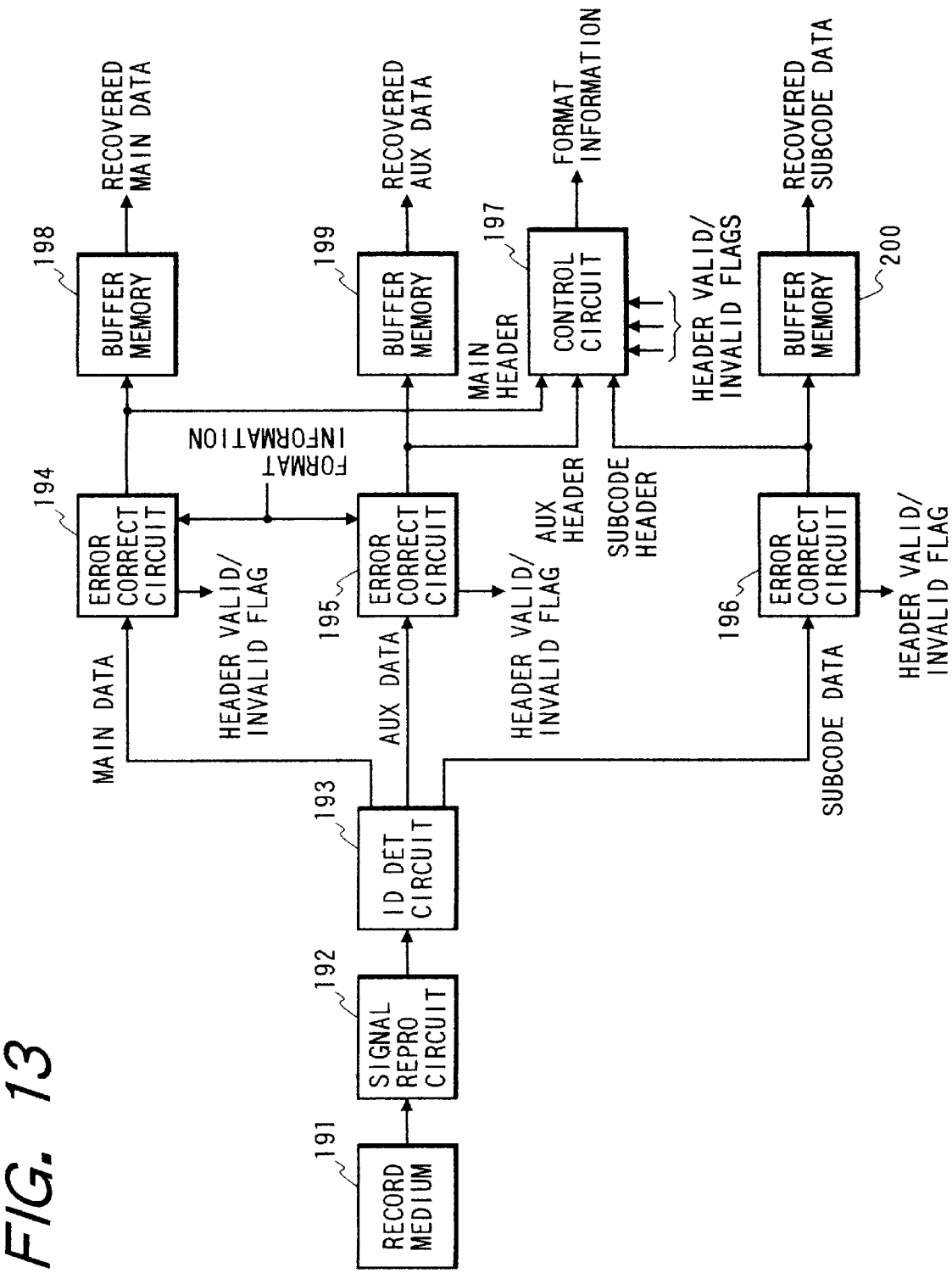
FIG. 13 is a block diagram of a reproducing system according to a second embodiment of this invention.

FIG. 13 shows a reproducing system according to a second embodiment of this invention. The recording system of FIG. 1 and the reproducing system of FIG. 13 may be combined into a recording and reproducing system.

With reference to FIG. 13, a recording medium 191 stores a digital signal in either the first predetermined track format (see FIG. 2) or the second predetermined track format (see FIG. 3). The digital signal is previously recorded on the recording medium 191 by, for example, the recording system of FIG. 1.

The recording medium 191 includes, for example, a magnetic tape. The reproducing system of FIG. 13 includes a magnetic-tape scanning portion of a magnetic recording and reproducing apparatus (for example, a video tape recorder, that is, a VTR) of a helical scan type. Specifically, two magnetic heads having different azimuth angles are mounted on a rotary drum at diametrically-opposed positions respectively, and the magnetic tape 191 is wound on the rotary drum in an angular range of about 180 degrees. The magnetic tape 191 in contact with the rotary drum extends along a part of a helix with respect to the rotary drum. The magnetic tape 191 is driven at a constant speed relative to the rotary drum or the magnetic heads. The digital signal is reproduced from the magnetic tape 191 via the magnetic heads.

A signal reproducing circuit 192 receives the reproduced digital signal. The signal reproducing circuit 192 subjects the reproduced digital signal to amplification and demodulation. The signal reproducing circuit 192 outputs the amplification/demodulation-resultant signal to an ID detecting circuit 193. The device 193 detects address information (ID information) in the output signal of the signal reproducing circuit 192. The address information (the ID information) detected by the device 193 corresponds to address information in the second sub area 52 in FIG. 5 or address information in the second sub area 62 in FIG. 6. In response to the detected address information, the ID detecting circuit 193 provides discrimination among a first digital signal reproduced from the data area 37 and the error correction code area 38 (see FIG. 2), a second digital signal reproduced from the data area 45 and the error correction code area 46 (see FIG. 3), a third digital signal reproduced from the data area 41 (see FIG. 3), and a fourth digital signal reproduced from the subcode area 33 (see FIGS. 2 and 3). The first digital signal corresponds to main data. The second digital signal corresponds to main data. The third digital signal corresponds to AUX data. The fourth digital signal corresponds to subcode data. The ID detecting circuit 193 feeds the first digital signal (the main data) and the second digital signal (the main data) to an error correction circuit 194. The ID detecting circuit 193 feeds the third digital signal (the AUX data) to an error correction circuit 195. The ID detecting circuit 193 feeds the fourth digital signal (the subcode data) to an error correction circuit 196.

The error correction circuits 194 and 195 receive format information from a control circuit 197 which represents the track format related to the digital signal currently reproduced from the recording medium 191. The error correction circuit 194 responds to the format information, and subjects the main data to an error correcting process suited to the track format related to the currently-reproduced digital signal. The error correcting process implemented by the device 194 refers to the related inner code signal and the related outer code signal. The error correction circuit 195 responds to the format information, and subjects the AUX data to an error correcting process suited to the track format related to the currently-reproduced digital signal. The error correcting process implemented by the device 195 refers to the related inner code signal and the related outer code signal. The error correction circuit 196 subjects the subcode data to an error correcting process. The error correcting process implemented by the device 196 refers to the related error correction code signal.

The error correction circuit 194 feeds the correction-resultant main data to the control circuit 197 and a buffer memory 198. The correction-resultant main data is temporarily stored in the buffer memory 198. The error correction circuit 195 feeds the correction-resultant AUX data to the control circuit 197 and a buffer memory 199. The correction-resultant AUX data is temporarily stored in the buffer memory 199. The error correction circuit 196 feeds the correction-resultant subcode data to the control circuit 197 and a buffer memory 200. The correction-resultant subcode data is temporarily stored in the buffer memory 200. The error correction circuit 194 informs the control circuit 197 of a header valid/invalid flag representing whether or not the related error correcting process has been successful. The error correction circuit 195 informs the control circuit 197 of a header valid/invalid flag representing whether or not the related error correcting process has been successful. The error correction circuit 196 informs the control circuit 197 of a header valid/invalid flag representing whether or not the related error correcting process has been successful. The error correction circuit 194 feeds the correction-resultant header data for the main data to the control circuit 197. The error correction circuit 195 feeds the correction-resultant header data for the AUX data to the control circuit 197. The error correction circuit 196 feeds the correction-resultant subcode header to the control circuit 197.

The control circuit 197 analyzes the header data for the main data, the header data for the AUX data, and the subcode header, and generates write control signals and read control signals for the buffer memories 198, 199, and 200 in response to the results of the analysis. The control circuit 197 outputs the write control signals to the buffer memories 198, 199, and 200 respectively. The control circuit 197 detects and recovers format information from the subcode header. When the control circuit 197 fails to detect format information in the subcode header, the control circuit 197 detects and recovers format information from the header data for the main data or the AUX data. The recovered format information represents whether the currently-reproduced digital signal relates to the first predetermined track format (see FIG. 2) or the second predetermined track format (see FIG. 3).

When the recovered format information represents that the currently-reproduced digital signal relates to the first predetermined track format (see FIG. 2), the control circuit 197 outputs the read control signals to the buffer memories 198 and 200. Therefore, the main data and the subcode data are read out from the buffer memories 198 and 200 as recovered main data and recovered subcode data respectively. When the recovered format information represents that the currently-reproduced digital signal relates to the second predetermined track format (see FIG. 3), the control circuit 197 outputs the read control signals to the buffer memories 198, 199, and 200. Therefore, the main data, the AUX data, and the subcode data are read out from the buffer memories 198, 199, and 200 as recovered main data, recovered AUX data, and recovered subcode data respectively.

As previously described, the subcode header information is recorded on the subcode area 33 (see FIGS. 2 and 3). The header data for the main data and the AUX data is placed on each main header area or each third sub area 53 (see FIG. 5) in the main data areas 37 and 45 (see FIGS. 2 and 3). The header data for the main data and the AUX data has a copy of the subcode header information in the subcode area 33. Thus, the copy of the subcode header information is located at a position considerably separate from the subcode area 33. In the event that the control circuit 197 fails to detect the subcode header information in the subcode area 33 due to a scratch on the recording medium 191 or a malfunction of the magnetic heads, the control circuit 197 detects and recovers the subcode header information from the header data for the main data or the AUX data. It should be noted that the main data areas 37 and 45 are remarkably higher in error correction ability than the subcode area 33. Accordingly, the reproducing system of FIG. 13 can more surely recover subcode header information.

In the case of the first predetermined track format (see FIG. 2) without the AUX data area 41 or the second predetermined track format (see FIG. 3) with the AUX data area 41, the subcode header information can be recovered by detecting data on the sixth byte of each of sync blocks (see FIG. 5) having order numbers #000–#017 and #029–#305 (see FIG. 4).

Figure 18:
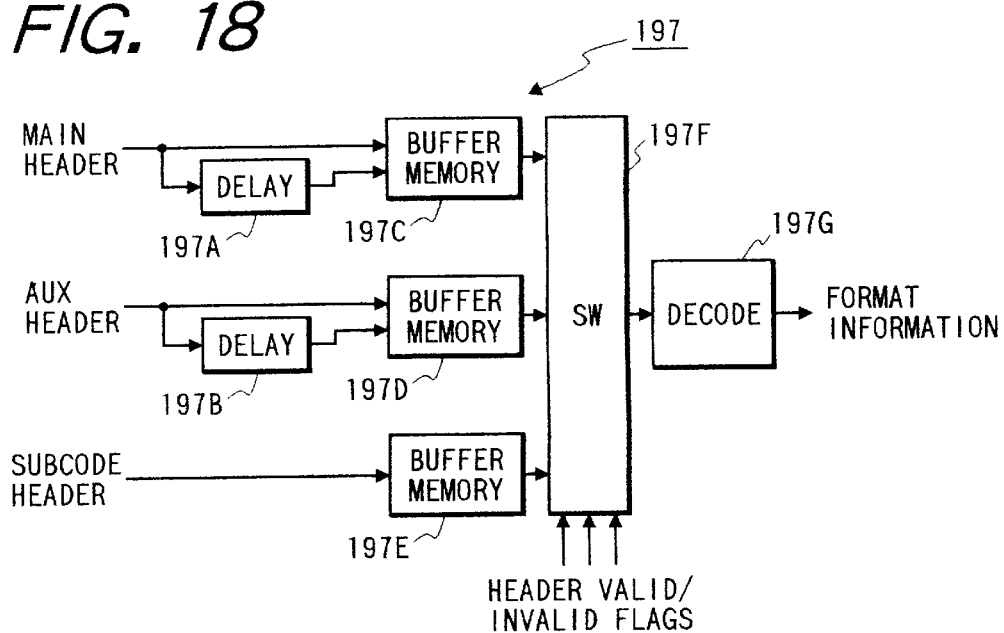
FIG. 18 is a block diagram of a part of a control circuit in FIG. 13.

FIG. 18 shows an example of a part of the control circuit 197. With reference to FIG. 18, the control circuit 197 includes delay circuits 197A and 197B, buffer memories 197C, 197D, and 197E, a switch 197F, and a decoder 197G. The circuit 197A delays the 4-bit header data for the main data by a time corresponding to one sample. The delayed 4-bit header data for the main data and the non-delayed 4-bit header data for the main data are written into the buffer memory 197C as 8-bit header data for the main data. The 8-bit header data for the main data is transmitted from the buffer memory 197C to the switch 197F. The circuit 197B delays the 4-bit header data for the AUX data by a time corresponding to one sample. The delayed 4-bit header data for the AUX data and the non-delayed 4-bit header data for the AUX data are written into the buffer memory 197D as 8-bit header data for the AUX data. The 8-bit header data for the AUX data is transmitted from the buffer memory 197D to the switch 197F. The 8-bit subcode header is written into the buffer memory 197E. The 8-bit subcode header is transmitted from the buffer memory 197E to the switch 197F. The switch 197F permits and inhibits the transmission of the main header, the AUX header, and the subcode header to the decoder 197G in response to the header valid/invalid flags. Specifically, the switch 197F permits the transmission of the main header to the decoder 197G when the related header valid/invalid flag indicates that the main header is effective. Otherwise, the switch 197F inhibits the transmission of the main header to the decoder 197G. The switch 197F permits the transmission of the AUX header to the decoder 197G when the related header valid/invalid flag indicates that the AUX header is effective. Otherwise, the switch 197F inhibits the transmission of the AUX header to the decoder 197G. The switch 197F permits the transmission of the subcode header to the decoder 197G when the related header valid/invalid flag indicates that the subcode header is effective. Otherwise, the switch 197F inhibits the transmission of the subcode header to the decoder 197G. The decoder 197G recovers the format information from the effective header information outputted by the switch 197F.

Third Embodiment

Figure 14:
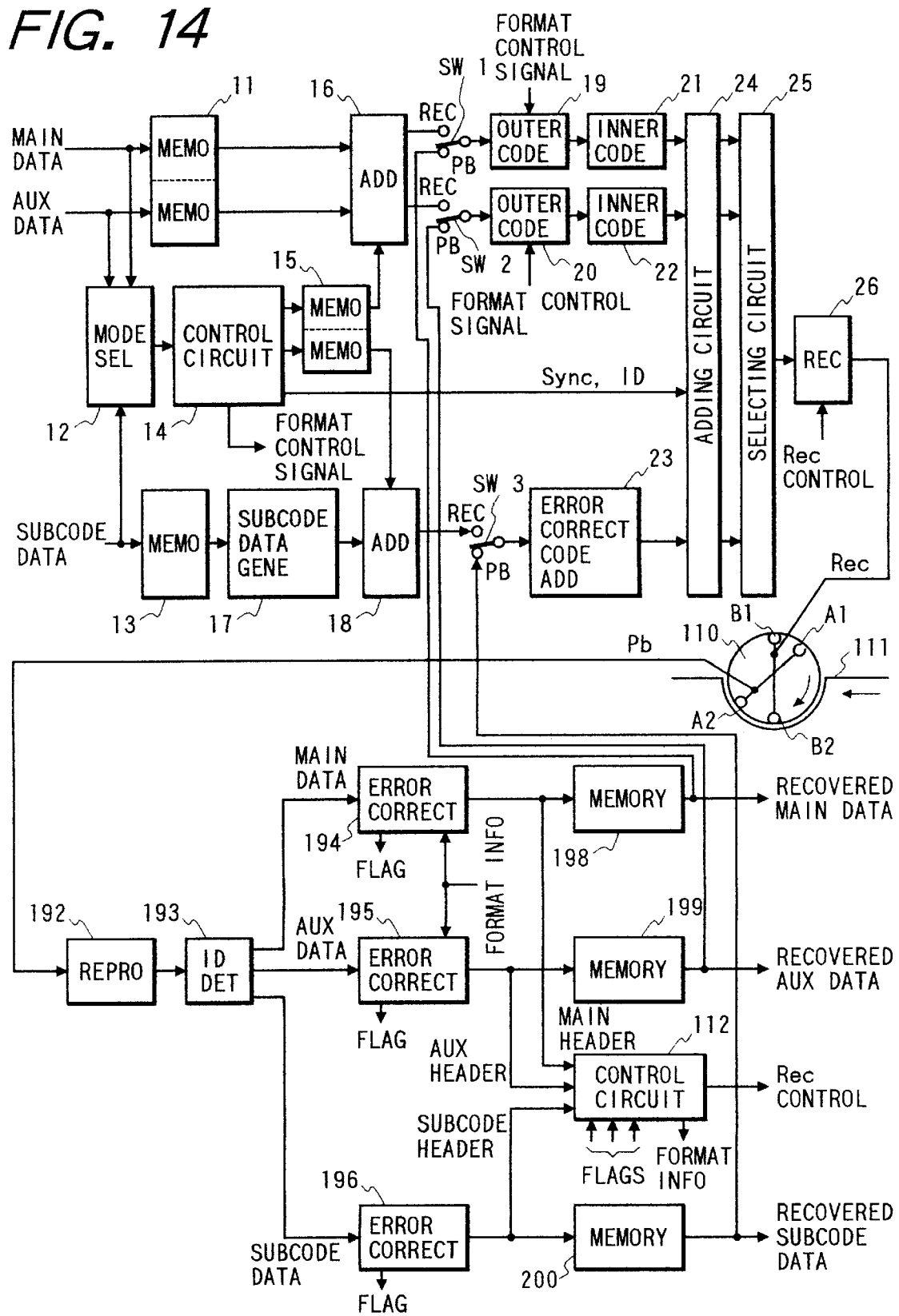
FIG. 14 is a block diagram of a recording and reproducing system according to a third embodiment of this invention.

FIG. 14 shows a recording and reproducing system according to a third embodiment of this invention. The recording and reproducing system of FIG. 14 is similar to a combination of the recording system of FIG. 1 and the reproducing system of FIG. 13 except for design changes indicated hereinafter.

With reference to FIG. 14, magnetic heads A1 and A2 having different azimuth angles are mounted on a rotary drum 110 at diametrically-opposed positions respectively. Magnetic heads B1 and B2 are mounted on the rotary drum 110 at diametrically-opposed positions respectively. The magnetic head B1 has the same azimuth angle as that of the magnetic head A1. The magnetic head B2 has the same azimuth angle as that of the magnetic head A2. The magnetic heads B1 and B2 follow the magnetic heads A1 and A2 respectively in the direction of movement of the rotary drum 110 relative to a magnetic tape 111. The magnetic heads A1 and A2 are connected to a signal reproducing circuit 192. The magnetic heads B1 and B2 are connected to a signal recording circuit 26. The magnetic tape 111 is wound on the rotary drum 110 in an angular range of about 180 degrees.

The recording and reproducing system of FIG. 14 includes switches SW1, SW2, and SW3 each changeable between a recording position REC and a playback position PB. The switch SW1 is connected among a header adding circuit 16, an outer code generating circuit 19, and a buffer memory 198. The switch SW2 is connected among the header adding circuit 16, an outer code generating circuit 20, and a buffer memory 199. The switch SW3 is connected among a header adding circuit 18, an error correction code adding circuit 23, and a buffer memory 200.

The recording and reproducing system of FIG. 14 includes a control circuit 112 instead of the control circuit 197 of FIG. 13. The control circuit 112 generates a recording control signal, and outputs the recording control signal to the signal recording circuit 26. The signal recording circuit 26 is enabled and disabled by the recording control signal.

During a playback mode (a reproducing mode) of operation of the recording and reproducing system of FIG. 14, the switches SW1, SW2, and SW3 are in their playback positions PB. Accordingly, recovered main data, recovered AUX data, and recovered subcode data are fed from the buffer memories 198, 199, and 200 to the outer code generating circuit 19, the outer code generating circuit 20, and the error correction code adding circuit 23 via the switches SW1, SW2, and SW3 respectively.

During the playback mode of operation of the recording and reproducing system of FIG. 14, the magnetic heads A1 and A2 reproduce a digital signal from the magnetic tape 111. The reproduced digital signal is fed from the magnetic heads A1 and A2 to the signal reproducing circuit 192. The reproduced digital signal is processed by the signal reproducing circuit 192 and later devices so that the reproduced digital signal is separated into main data, AUX data, and subcode data. The main data, the AUX data, and the subcode data are stored into the buffer memories 198, 199, and 200 respectively.

During the playback mode of operation of the recording and reproducing system of FIG. 14, the control circuit 112 receives a header valid/invalid flag from an error correction circuit 196. The control circuit 112 checks whether or not a subcode header has been correctly recovered by referring to the header valid/invalid flag outputted from the error correction circuit 196. When a subcode header has not been correctly recovered, the control circuit 112 detects and recovers subcode header information from header data for the main data or the AUX data. The control circuit 112 writes the recovered subcode header information over a given place within the subcode data in the buffer memory 200. Accordingly, even in the event that a subcode header has not been correctly reproduced from a subcode area 33 (see FIGS. 2 and 3), the recovered subcode data outputted from the buffer memory 200 has correct subcode header information.

In the case where the control circuit 112 detects that a subcode header has not been correctly recovered, that is, in the case where the control circuit 112 detects a subcode data block from which a subcode header has not been correctly recovered, the control circuit 112 changes the recording control signal to an on state. The recording control signal being in the on state enables the signal recording circuit 26. Therefore, a modulation/amplification-resultant signal generated by the signal recording circuit 26 is rerecorded on the magnetic tape 111 via the magnetic heads B1 and B2. In other words, the modulation/amplification resultant signal is written over the previously-recorded digital signal on the magnetic tape 111. It should be noted that the magnetic heads B1 and B2 follow the magnetic heads A1 and A2 respectively. The modulation/amplification resultant signal contains the recovered subcode data outputted from the buffer memory 200. As previously described, the recovered subcode data outputted from the buffer memory 200 has the correct subcode header information. Thus, the newly-recorded digital signal on the magnetic tape 111 has a correct subcode header.

As previously described, in the event that subcode header information fails to be reproduced from the subcode area 33 (see FIGS. 2 and 3), subcode header information is reproduced from main data areas 37 and 45 (see FIGS. 2 and 3). It should be noted that the main data areas 37 and 45 are remarkably higher in error correction ability than the subcode area 33. The reproduced subcode header information is recorded in the subcode area 33 via the magnetic heads B1 and B2 on a real-time basis.

FIG. 19 shows conditions where subcode data in reproduced data has a sequence of a first "NG" portion, a first "OK" portion, a second "NG" portion, and a second "OK" portion. As shown in FIG. 19, the first and second "OK" portions of the reproduced subcode data are copied onto subcode data in recording data. On the other hand, the first and second "NG" portions of the reproduced subcode data are replaced by corresponding effective portions of main data in the reproduced data. The corresponding effective portions of the reproduced main data are used in the subcode data in the recording data. Here, the recording data means the output signal of a selecting circuit 25 or the output signal of the signal recording circuit 26. As shown in FIG. 19, the recording control signal fed from the control circuit 112 to the signal recording circuit 26 remains in the on state during an interval for which the recording data represents the subcode data.

During a recording mode of operation of the recording and reproducing system of FIG. 14, the switches SW1, SW2, and SW3 are in their recording positions REC. Accordingly, the outer code generating circuits 19 and 20 are connected to the header adding circuit 16. In addition, the error correction code adding circuit 23 is connected to the header adding circuit 18.

What is claimed is:

1. A method of recording a digital signal, comprising the steps of:

recording a digital signal along tracks on a recording medium, the tracks each having a main data area and a subcode area, the main data area having a plurality of main data blocks, the subcode area having a plurality of subcode data blocks, the subcode area being smaller in size than the main data area, the digital signal including main information and subcode information, the main information including at least one of audio data and video data, the main information being composed of a plurality of main information pieces recorded on the respective main data blocks of the main data area, the subcode information representing a format of the main information, the subcode information being composed of a plurality of subcode information pieces recorded on the respective subcode data blocks of the subcode area, a plurality of first error correction code signals being recorded on the respective main data blocks of the main data area, the first error correction code signals being used for correcting errors within the main information pieces of the main data blocks respectively, a second error correction code signal being recorded on the main data area, the second error correction code signals being used for correcting errors within all the main information pieces in the main data area, a plurality of third error correction code signals being recorded on the respective subcode data blocks of the subcode area, the third error correction code signals being used for correcting errors within the subcode information pieces of the subcode data blocks respectively; and repetitively recording additional information on the main data area in a unit corresponding to one main data block, the additional information being equal in contents to the subcode information recorded on the subcode area, the additional information being recorded in such a manner as to enable error correction in response to the first error correction code signals and the second error correction code signal recorded on the main data area, the subcode information being recorded in such a manner as to enable error correction in response to the third error correction code signals recorded on the subcode area.

2. A method as recited in claim 1, wherein the format represented by the subcode information is changeable among plural predetermined formats.

3. A method of reproducing a digital signal from a recording medium formed with tracks each having a main data area and a subcode area, the main data area having a plurality of main data blocks, the subcode area having a plurality of subcode data blocks, the subcode area being smaller in size than the main data area, the digital signal including main information and subcode information, the main information Including at least one of audio data and video data, the main information being composed of a plurality of main information pieces recorded on the respective main data blocks of the main data area, the subcode information representing a format of the main information, the subcode information being composed of a plurality of subcode information pieces recorded on the respective subcode data blocks of the subcode area, a plurality of first error correction code signals being recorded on the respective main data blocks of the main data area, the first error correction code signals being used for correcting errors within the main information pieces of the main data blocks respectively, a second error correction code signal being recorded on the main data area, the second error correction code signals being used for correcting errors within all the main information pieces in the main data area, a plurality of third error correction code signals being recorded on the respective subcode data blocks of the subcode area, the third error correction code signals being used for correcting errors within the subcode information pieces of the subcode data blocks respectively, additional information being repetitively recorded on the main data area in a unit corresponding to one main data block, the additional information being equal in contents to the subcode information recorded on the subcode area, the additional information being recorded in such a manner as to enable error correction in response to the first error correction code signals and the second error correction code signal recorded on the main data area, the subcode information being recorded in such a manner as to enable error correction in response to the third error correction code signals recorded on the subcode area, the method comprising the steps of:

reading out the digital signal from the recording medium;

recovering the subcode information from a first portion of the digital signal which is read out from the subcode area;

in cases where the subcode information fails to be recovered from the first portion of the digital signal which is read out from the subcode area, receiving the subcode information from a second portion of the digital signal which is read out from the main data area;

recovering the first, second, and third error correction code signals from the readout digital signal; and correcting an error in the readout digital signal in response to at least one of the first, second, and third error correction code signals.

4. A method as recited in claim 3, wherein the format represented by the subcode information is changeable among plural predetermined formats.

5. A method as recited in claim 3, further comprising the step of, in cases where the subcode information fails to be recovered from the first portion of the digital signal which is read out from the subcode area, recording information which is read out from the main data area on the subcode area again.

6. An apparatus for recording a digital signal, comprising:

means for recording a digital signal along tracks on a recording medium, the tracks each having a main data area and a subcode area, the main data area having a plurality of main data blocks, the subcode area having a plurality of subcode data blocks, the subcode area being smaller in size than the main data area, the digital signal including main information and subcode information, the main information including at least one of audio data and video data, the main information being composed of a plurality of main information pieces recorded on the respective main data blocks of the main data area, the subcode information representing a format of the main information, the subcode information being composed of a plurality of subcode information pieces recorded on the respective subcode data blocks of the subcode area, a plurality of first error correction code signals being recorded on the respective main data blocks of the main data area, the first error correction code signals being used for correcting errors within the main information pieces of the main data blocks respectively, a second error correction code signal being recorded on the main data area, the second error correction code signals being used for correcting errors within all the main information pieces in the main data area, a plurality of third error correction code signals being recorded on the respective subcode data blocks of the subcode area, the third error correction code signals being used for correcting errors within the subcode information pieces of the subcode data blocks respectively; and means for repetitively recording additional information on the main data area in a unit corresponding to one main data block, the additional information being equal in contents to the subcode information recorded on the subcode area, the additional information being recorded in such a manner as to enable error correction in response to the first error correction code signals and the second error correction code signal recorded on the main data area, the subcode information being recorded in such a manner as to enable error correction in response to the third error correction code signals recorded on the subcode area.

7. An apparatus as recited in claim 6, wherein the format being represented by the subcode information is changeable among plural predetermined formats.

8. An apparatus for reproducing a digital signal from a recording medium formed with tracks each having a main data area and a subcode area, the main data area having a plurality of main data blocks, the subcode area having a plurality of subcode data blocks, the subcode area being smaller in size than the main data area, the digital signal including main information and subcode information, the main information including at least one of audio data and video data, the main information being composed of a plurality of main information pieces recorded on the respective main data blocks of the main data area, the subcode information representing a format of the main information, the subcode information being composed of a plurality of subcode information pieces recorded on the respective subcode data blocks of the subcode area, a plurality of first error correction code signals being recorded on the respective main data blocks of the main data area, the first error correction code signals being used for correcting errors within the main information pieces of the main data blocks respectively, a second error correction code signal being recorded on the main data area, the second error correction code signals being used for correcting errors within all the main information pieces in the main data area, a plurality of third error correction code signals being recorded on the respective subcode data blocks of the subcode area, the third error correction code signals being used for correcting errors within the subcode information pieces of the subcode data blocks respectively, additional information being repetitively recorded on the main data area in a unit corresponding to one main data block, the additional information being equal in contents to the subcode information recorded on the subcode area, the additional information being recorded in such a manner as to enable error correction in response to the first error correction code signals and the second error correction code signal recorded on the main data area, the subcode information being recorded in such a manner as to enable error correction in response to the third error correction code signals recorded on the subcode area, the apparatus comprising:

means for reading out the digital signal from the recording medium;

means for recovering the subcode information from a first portion of the digital signal which is read out from the subcode area;

means for, in cases where the subcode information fails to be recovered from the first portion of the digital signal which is read out from the subcode area, recovering the subcode information from a second portion of the digital signal which is read out from the main data area;

means for recovering the first, second, and third error correction code signals from the readout digital signal; and means for correcting an error in the readout digital signal in response to at least one of the first, second, and third error correction code signals.

9. An apparatus as recited in claim 8, wherein the format represented by the subcode information is changeable among plural predetermined formats.

10. An apparatus as recited in claim 9, further comprising means for, in cases where the subcode information fails to be recovered from the first portion of the digital signal which is read out from the subcode area, recording information which is read out from the main data area on the subcode area again.

11. A recording medium comprising tracks along which a digital signal is recorded, the tracks each having a main data area and a subcode area, the main data area having a plurality of main data blocks, the subcode area having a plurality of subcode data blocks, the subcode area being smaller in size than the main data area, the digital signal including main information and subcode information, the main information including at least one of audio data and video data, the main information being composed of a plurality of main information pieces recorded on the respective main data blocks of the main data area, the subcode information representing a format of the main information, the subcode information being composed of a plurality of subcode information pieces recorded on the respective subcode data blocks of the subcode area, a plurality of first error correction code signals being recorded on the respective main data blocks of the main data area, the first error correction code signals being used for correcting errors within the main information pieces of the main data blocks respectively, a second error correction code signal being recorded on the main data area, the second error correction code signals being used for correcting errors within all the main information pieces in the main data area, a plurality of third error correction code signals being recorded on the respective subcode data blocks of the subcode area, the third error correction code signals being used for correcting errors within the subcode information pieces of the subcode data blocks respectively, additional information being repetitively recorded on the main data area in a unit corresponding to one main data block, the additional information being equal in contents to the subcode information recorded on the subcode area, the additional information being recorded in such a manner as to enable error correction in response to the first error correction code signals and the second error correction code signal recorded on the main data area, the subcode information being recorded in such a manner as to enable error correction in response to the third error correction code signals recorded on the subcode area.

12. A method of recording a digital signal, comprising the steps of:

recording a digital signal along tracks on a recording medium, the tracks each having a main data area and a subcode area, the main data area having a plurality of main data blocks, the subcode area having a plurality of subcode data blocks, the subcode area being smaller in size than the main data area, the digital signal including main information and subcode information, the main information including at least one of audio data and video data, the main information being composed of a plurality of main information pieces recorded on the respective main data blocks of the main data area, the subcode information representing a format of the main information, the subcode information being composed of a plurality of subcode information pieces recorded on the respective subcode data blocks of the subcode area, a plurality of first error correction code signals being recorded on the respective main data blocks of the main data area, the first error correction code signals being used for correcting errors within the main information pieces of the main data blocks respectively, a second error correction code signal being recorded on the main data area, the second error correction code signals being used for correcting errors within all the main information pieces in the main data area, a plurality of third error correction code signals being recorded on the respective subcode data blocks of the subcode area, the third error correction code signals being used for correcting errors within the subcode information pieces of the subcode data blocks respectively; and recording additional information on the main data area, the additional information being equal in contents to the subcode information recorded on the subcode area, the additional information being recorded in such a manner as to enable error correction in response to the first error correction code signals and the second error correction code signal recorded on the main data area, the subcode information being recorded in such a manner as to enable error correction in response to the third error correction code signals recorded on the subcode area.

* * * * *